United States Patent
Rico Alvarino et al.

(10) Patent No.: US 10,708,903 B2
(45) Date of Patent: Jul. 7, 2020

(54) DRX FOR NARROWBAND TRANSMISSIONS

(71) Applicant: QUALCOMM Incorporated, San Diego, CA (US)

(72) Inventors: Alberto Rico Alvarino, San Diego, CA (US); Madhavan Srinivasan Vajapeyam, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/377,857

(22) Filed: Apr. 8, 2019

(65) Prior Publication Data

US 2019/0239194 A1    Aug. 1, 2019

Related U.S. Application Data

(62) Division of application No. 15/236,947, filed on Aug. 15, 2016, now Pat. No. 10,321,447.

(Continued)

(51) Int. Cl.
*H04W 72/04* (2009.01)
*H04W 76/28* (2018.01)
(Continued)

(52) U.S. Cl.
CPC ........... *H04W 72/042* (2013.01); *H04W 4/70* (2018.02); *H04W 52/0225* (2013.01);
(Continued)

(58) Field of Classification Search
CPC ..... H04W 72/042; H04W 76/28; H04W 4/70; H04W 52/0225; Y02D 70/26;
(Continued)

(56) References Cited

U.S. PATENT DOCUMENTS

| 10,306,441 B2 | 5/2019 | Alvarino et al. |
| 2011/0128896 A1 | 6/2011 | Huang et al. |

(Continued)

FOREIGN PATENT DOCUMENTS

| EP | 2919402 A1 | 9/2015 |
| WO | 2013169173 A1 | 11/2013 |
| WO | 2015050099 A1 | 4/2015 |

OTHER PUBLICATIONS

International Preliminary Report on Patentability—PCT/US2016/058083, The International Bureau of WIPO—Geneva, Switzerland, dated May 11, 2016.

(Continued)

*Primary Examiner* — Omar J Ghowrwal
(74) *Attorney, Agent, or Firm* — Nerrie M. Zohn

(57) ABSTRACT

In narrowband communication, channels may use repetitions in multiple subframes. SPS and DRX for the narrowband communication may not accommodate such repetitions, because repetitions for a channel may fall only partially within a DRX ON duration. An apparatus addresses this problem by determining a DRX ON duration, determining a set of subframes carrying a narrowband PDCCH candidate and determining that the DRX ON duration at least partially overlaps with the set of subframes of the narrowband PDCCH. The apparatus then refrains from decoding the first narrowband PDCCH candidate, decodes the first narrowband PDCCH candidate, or extends the DRX ON duration to include the set of subframes entirely and decoding the first narrowband PDCCH candidate carried in the set of subframes in the extended DRX ON duration. The apparatus may also determine DRX configuration parameters based on parameters of bundled channels, and handle invalid subframes for an SPS grant.

28 Claims, 18 Drawing Sheets

Related U.S. Application Data

(60) Provisional application No. 62/246,569, filed on Oct. 26, 2015.

(51) Int. Cl.
  *H04W 4/70* (2018.01)
  *H04W 52/02* (2009.01)
  *H04L 5/00* (2006.01)
  *H04L 1/18* (2006.01)

(52) U.S. Cl.
  CPC ............ *H04W 76/28* (2018.02); *H04L 1/189* (2013.01); *H04L 1/1822* (2013.01); *H04L 5/005* (2013.01); *H04L 5/0051* (2013.01); *H04L 5/0053* (2013.01); *H04L 5/0057* (2013.01); *Y02D 70/1242* (2018.01); *Y02D 70/1262* (2018.01); *Y02D 70/142* (2018.01); *Y02D 70/21* (2018.01); *Y02D 70/24* (2018.01); *Y02D 70/26* (2018.01)

(58) Field of Classification Search
  CPC .. Y02D 70/21; Y02D 70/142; Y02D 70/1242; Y02D 70/24; Y02D 70/1262; H04L 5/0057; H04L 5/0051; H04L 5/005; H04L 1/1822; H04L 5/0053; H04L 1/189
  See application file for complete search history.

(56) References Cited

U.S. PATENT DOCUMENTS

| | | | |
|---|---|---|---|
| 2011/0199910 A1 | 8/2011 | Oh et al. | |
| 2015/0029923 A1 | 1/2015 | Xu et al. | |
| 2015/0049740 A1 | 2/2015 | Lee et al. | |
| 2015/0092563 A1* | 4/2015 | Tabet | H04W 28/0221 370/241 |
| 2015/0181575 A1 | 6/2015 | Ng et al. | |
| 2015/0282208 A1 | 10/2015 | Yi et al. | |
| 2016/0301515 A1 | 10/2016 | Ouchi et al. | |
| 2017/0118747 A1 | 4/2017 | Rico Alvarino et al. | |
| 2017/0118792 A1 | 4/2017 | Rico Alvarino et al. | |
| 2017/0280404 A1 | 9/2017 | You et al. | |
| 2018/0206252 A1* | 7/2018 | Thangarasa | H04W 72/1215 |
| 2018/0249440 A1 | 8/2018 | Zhang et al. | |
| 2018/0262975 A1* | 9/2018 | Martinez Tarradell | H04W 16/10 |
| 2019/0239195 A1 | 8/2019 | Rico et al. | |
| 2020/0037295 A1 | 1/2020 | Rico Alvarino et al. | |

OTHER PUBLICATIONS

International Search Report and Written Opinion—PCT/US2016/058083—ISA/EPO—dated Mar. 27, 2017.

Mediatek Inc: "Impact of Enhanced Coverage on other Physical Channels," 3GPP Draft; R2-140526 Impact of Enhanced Coverage on Other Physical Channels, 3rd Generation Partnership Project (3GPP), Mobile Competence Centre ; 650 , Route Des Lucioles ; F-06921 Sophia-Antipolis C, vol. RAN WG2, No. Prague, Czech Republic; Feb. 10, 2014-Feb. 14, 2014 Feb. 9, 2014 (Feb. 9, 2014), XP050791873, Retrieved from the Internet: URL:http://www.3gpp.org/ftp/Meetings_3GPP_SYNC/RAN2/Docs/ [retrieved on Feb. 9, 2014], 5 pages.

Nsn et al., "Coverage Enhancements Analysis for Low Cost MTC UEs," 3GPP Draft; R2-140063 Coverage Enhancement Analysis for Low Cost MTC, 3rd Generation Partnership Project (3GPP), Mobile Competence Centre ; 550 Lucioles ; F-06921 Sophia-Antipolis Cedex vol. RAN WG2, No. Prague, Czech Republic; Feb. 9, 2014 (Feb. 9, 2014), XP050791499, Retrieved from the Internet: URL:http://www.3gpp.org/ftp/Meetings_3GPP_SYNC/RAN2/Docs/ [retrieved on Feb. 9, 2014], 4 pages.

Partial International Search Report—PCT/US2016/058083—ISO/EPO—dated Jan. 12, 2017.

Samsung., "DRX Enhancements for Rel-13 Low Complexity MTC", 3GPP Draft, R2-154425, 3rd Generation Partnership Project (3GPP), Mobile Competence Centre, 650, Route Des Lucioles, F-06921 Sophia-Antipolis Cedex, France, vol. RAN WG2, No. Malmo, Sweden, Oct. 5, 2015-Oct. 9, 2015, Oct. 4, 2015 (Oct. 4, 2015), XP051004996, 4 pages. Retrieved from the Internet: URL: http://www.3gpp.org/ftp/Meetings_3GPP_SYNC/RAN2/Docs/.

Samsung: "Search Space Design and Transmission Timing for DL Control Signaling," 3GPP Draft; R1-150348 DL Control Search Space, 3rd Generation Partnership Project Space, (3GPP), Mobile Competence Centre ; 650 Route Des Lucioles ; F-06921 Sophia-Antipolis Cedex ; France vol. RAN WG1, No. Athens, Greece; Feb. 9, 2015-Feb. 13, 2015, Feb. 8, 2015 (Feb. 8, 2015), XP050933557 Retrieved from the Internet: URL:http://www.3gpp.org/ftp/Meetings_3GPP_SYNC/RAN1/Docs/ [retrieved on Feb. 8, 2015], 4 pages.

Taiwan Search Report—TW105133993—TIPO—dated Jan. 21, 2020.

* cited by examiner

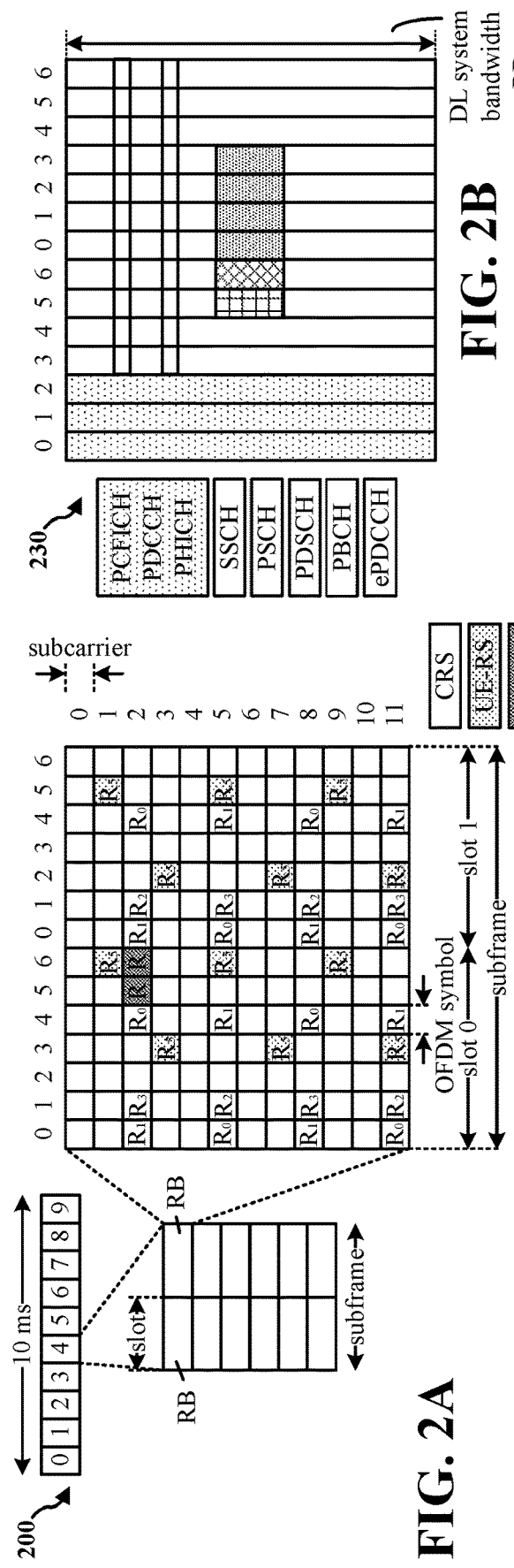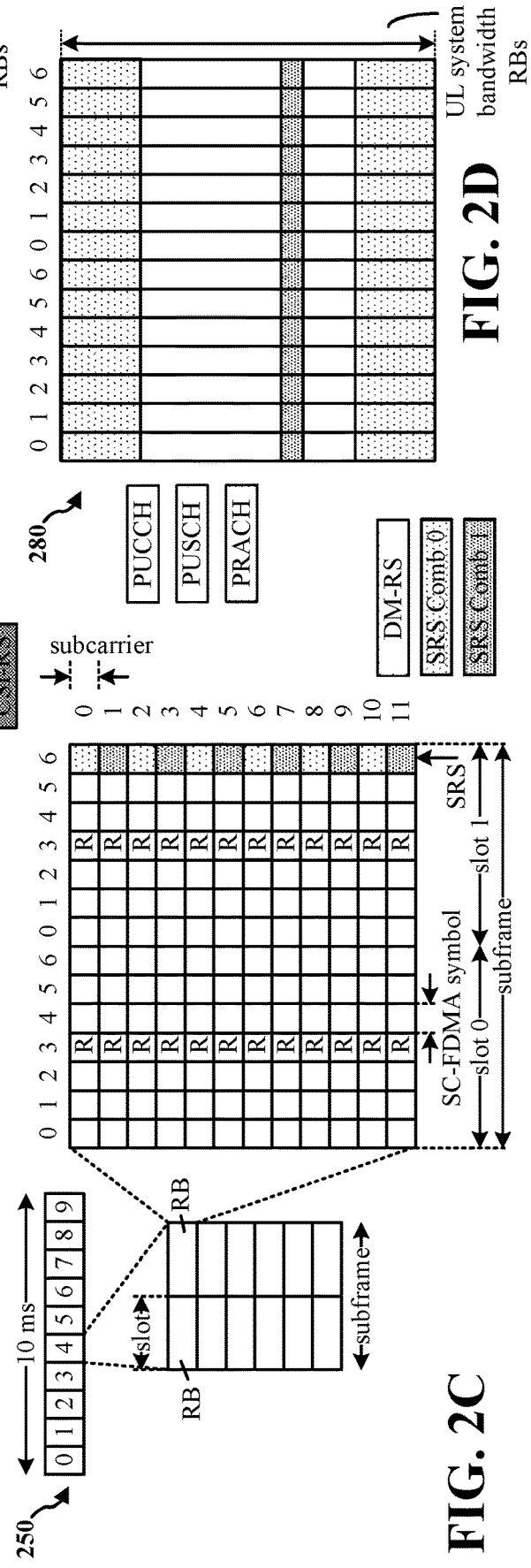

DRX FOR NARROWBAND TRANSMISSIONS

CROSS-REFERENCE TO RELATED APPLICATION

This application is a divisional of U.S. patent application Ser. No. 15/236,947, entitled "DRX AND SPS FOR MTC WITH BUNDLED TRANSMISSIONS" and filed on Aug. 15, 2016, which claims the benefit of U.S. Provisional Application Ser. No. 62/246,569, entitled "DRX AND SPS FOR MTC WITH BUNDLED TRANSMISSIONS" and filed on Oct. 26, 2015, which are expressly incorporated by reference herein in their entirety.

BACKGROUND

Field

The present disclosure relates generally to communication systems, and more particularly, to discontinuous reception (DRX) as applied to narrowband communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Discontinuous reception (DRX) is a technique that may be used in wireless communications to conserve the battery life of a user equipment (UE). To perform DRX, the UE and the network may negotiate wake-up window periods during which the UE powers on the receiver to allow data transfer with the network. Outside of the wake-up window periods, the UE may turn the receiver off and enter a low or zero power state to conserve battery life.

In enhanced machine type communication (eMTC), channels may be bundled in the time domain, using repetitions in multiple subframes. Current semi-persistent scheduling (SPS) and DRX for MTC or eMTC may not accommodate such repetitions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In eMTC, channels may be bundled, e.g., repeated using multiple subframes. For example, a control channel may use a repetition level of 2 every 2 subframes, 4 every 4 subframes, etc. Data channels may also be bundled with dynamic length. At times, the starting subframe for the control channel might not be aligned with the radio frame boundary.

Current SPS and DRX for MTC/eMTC may not accommodate such repetitions. For example, repetitions for a bundled channel may partially fall within a DRX ON duration and may partially be outside of the DRX ON duration. Therefore, a UE might only have its receiver turned on to receive a portion of the subframes of the bundled channel.

The present disclosure solves this problem by providing the UE with techniques for handling a bundled channel that only partially overlaps a DRX ON duration, as well as techniques for determining DRX configuration parameters based on parameters of bundled channels and handling invalid subframes for an SPS grant.

In an aspect of the disclosure, a method, a computer-readable medium, and an apparatus are provided. The apparatus determines a DRX ON duration and determines a set of subframes carrying a first narrowband physical downlink control channel (PDCCH) candidate, the set of subframes including a plurality of subframes. The apparatus determines that the DRX ON duration at least partially overlaps with the set of subframes and performs one of (a) refraining from decoding the first narrowband PDCCH candidate, (b) decoding the first narrowband PDCCH candidate, or (c) extending the DRX ON duration to include the set of subframes entirely and decoding the first narrowband PDCCH candidate carried in the set of subframes in the extended DRX ON duration. For example, the apparatus may decode the first narrowband PDCCH candidate, if all of the plurality of subframes of the first narrowband PDCCH candidate are within the DRX ON duration and may refrain from decoding the first narrowband PDCCH candidate if at least one subframe of the plurality of subframes of the first narrowband PDCCH candidate is outside of the DRX ON duration.

In another aspect of the disclosure, a method, a computer-readable medium, and an apparatus are provided. The apparatus determines a parameter of an M-PDCCH candidate monitored by a UE, receives an indication associated with a DRX configuration of the UE, and determines a DRX configuration parameter, the DRX configuration parameter being a function of the parameter of the M-PDCCH candidate and the indication. For example, the parameter of the bundled M-PDCCH may comprise a repetition level and/or the indication may comprise a number of subframes for which the UE should monitor PDCCH.

In another aspect of the disclosure, a method, a computer-readable medium, and an apparatus are provided. The apparatus receives an SPS grant for a set of subframes, the set of subframes including an unavailable subframe, determines a subset of available subframes in the set of subframes, and adjusts reception or transmission during the set of subframes based on the subset of available subframes. For example, the apparatus may postpone a bundled transmission scheduled for the unavailable subframe and for any subframe of the set of subframes that is subsequent to the unavailable subframe. As another example, the apparatus may drop a bundled transmission scheduled for the unavailable subframe or drop the entire transmission that would partially overlap with the unavailable subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
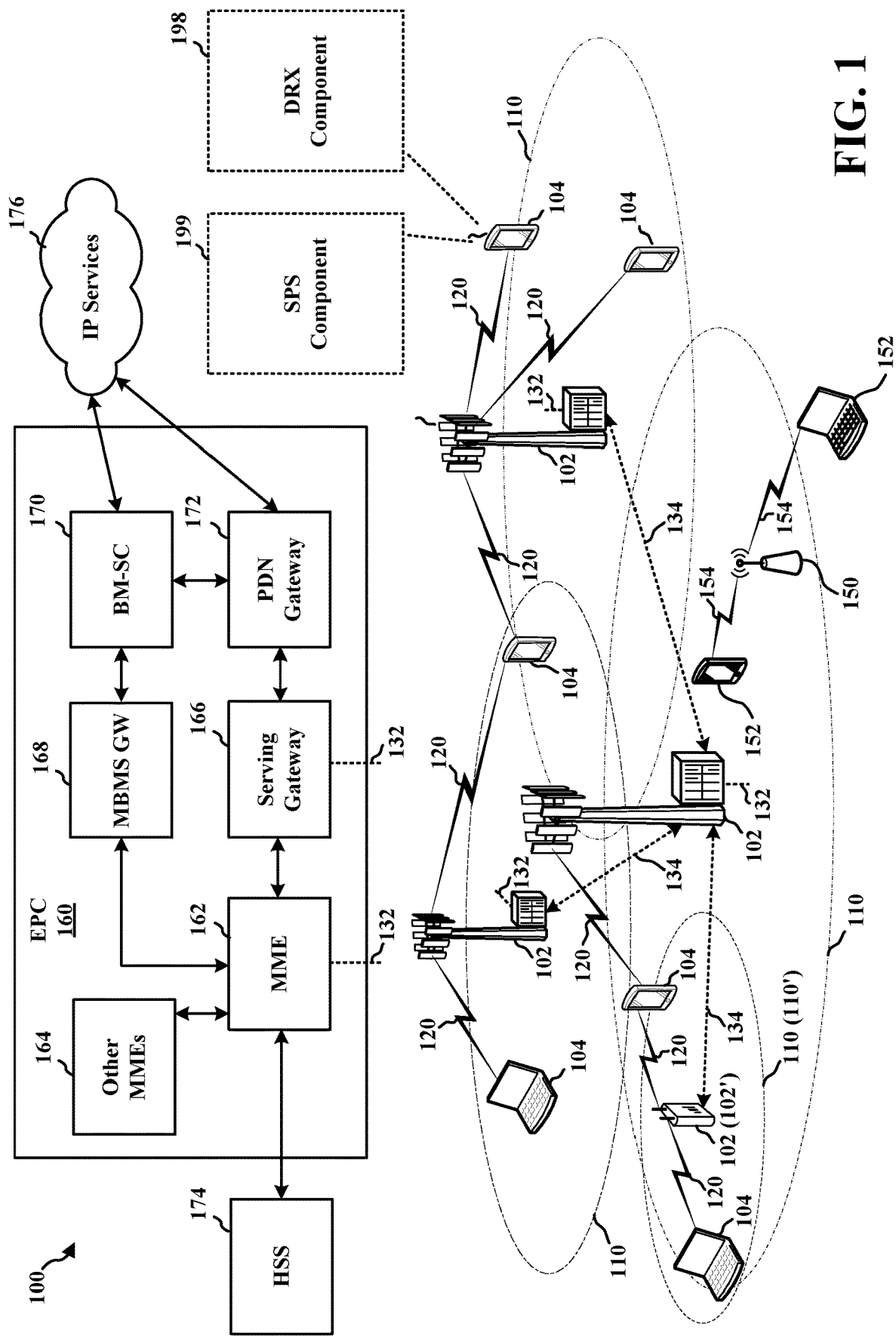
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a WI-FI® access point (AP) 150 in communication with WI-FI® stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the WI-FI® AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MULTEFIRE®.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a DRX component 198 configured to determine how to handle bundled M-PDCCH candidates that partially overlap a DRX ON duration and/or for determining DRX configuration parameters. In other aspects, the UE 104 may comprise an SPS component 199 configured to adjust DRX reception or transmission when subframes of an SPS grant are unavailable.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
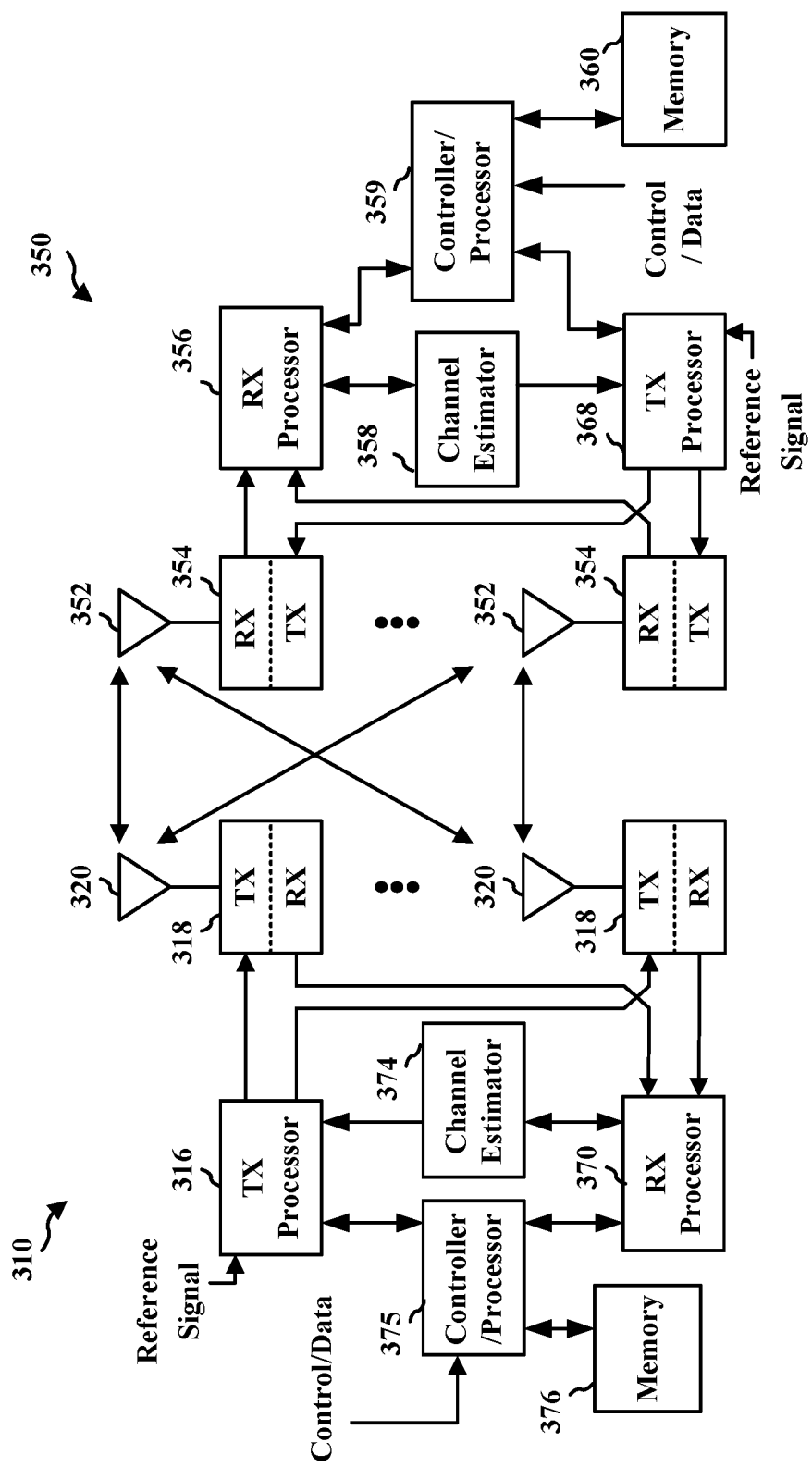
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Category 0 UEs may include low cost MTC UEs. An MTC UE may be implemented with reduced peak data rates (e.g., a maximum of 1000 bits for a transport block size). Further, an MTC UE may be limited to supporting rank 1 transmissions and/or having 1 receive antenna. When an MTC UE is half-duplex, the MTC UE may have a relaxed switching timing (switching from transmission to reception or reception to transmission) compared to legacy or non-MTC UEs in accordance with the LTE standards. For example, a non-MTC UE may have a switching time on the order of 20 microseconds, while an MTC UE may have a switching time on the order of 1 millisecond.

MTC UEs may monitor DL control channels in the same way as non-MTC UEs, e.g., monitoring wideband signals, monitoring for both PDCCH and EPDCCH, etc. Additional MTC enhancements may be supported. Although MTC UEs operate in a narrowband, the MTC UEs may also be capable of operation in a wider system bandwidth (e.g., 1.4/3/5/10/15/20 MHz). For example, the MTC UEs may work in a system bandwidth of 1.4 MHz and may use 6 resource blocks (RBs). Further, the MTC UEs may have enhanced coverage up to 15 dB.

In eMTC with extended coverage support, one or more channels may be bundled (e.g., repeated) in the time domain. In particular, bundled M-PDCCH may use multiple subframes for transmission. Resources for an M-PDCCH may be allocated by an eNB in accordance with requirements for ePDCCH within the narrowband on which an MTC UE is operating.

An eNodeB may configure an M-PDCCH with a repetition level. For example, an M-PDCCH with a repetition level 2 may be repeated in 2 consecutive subframes. An M-PDCCH with a repetition level 4 are repeated in 4 consecutive subframes. The bits of the repetitions may be the same. However, different scrambling sequences may be used for the repetitions. The MTC UE may need to receive each of the repetitions, or most of the repetitions, in order to reliably decode the M-PDCCH. Accordingly, an MTC UE monitors an M-PDCCH with repetition level 2 every 2 subframes and monitors an M-PDCCH with repetition level 4 every 4 subframes. An MTC UE that monitors M-PDCCH candidates of repetition levels 2 and 4 may be denoted as having a configuration of R={2, 4}.

Further, data channels such as MTC-PUSCH (M-PUSCH) and MTC-PDSCH (M-PDSCH) may be bundled with dynamic length. For example, an eNodeB may indicate in the M-PDCCH that the M-PUSCH has a repetition level 15 and that the M-PDSCH has a repetition level 13. Static TTI bundling may be used for PUSCH.

Not all subframes may be available for reception or transmission at the MTC UE. Thus, an eNB may be configured to signal the pattern of available subframes in uplink and downlink. This may cause a starting subframe for M-PDCCH monitoring not to be aligned with a radio frame boundary. At times, a DRX ON duration may only partially overlap bundled M-PDCCH subframes, CSI reference subframes, or subframes in an SPS grant.

As such, there is a need for improved techniques for SPS and DRX procedures that may accommodate for multiple subframes and that address such partial overlap situations.

MTC and DRX

In the M-PDCCH region of a DL radio subframe, there can be many places where a specific M-PDCCH is located. In order to obtain the M-PDCCH, an MTC UE may search all the possible locations. The possible location for an M-PDCCH differs depending on whether the M-PDCCH is UE-specific or common, and also depending on the aggregation level used. All the possible location for an M-PDCCH may be referred to as a search space and each of the possible location may be referred to as an M-PDCCH candidate. Additionally, if the M-PDCCH is bundled the search space may comprise more than one subframe.

To reduce the terminal power consumption, LTE standards include mechanisms for DRX. To perform DRX, the UE and the network may negotiate wake-up window periods during which the UE powers on the receiver to allow data transfer with the network. Outside of the wake-up window periods, the UE may turn the receiver off and enter a low or zero power state to conserve battery life. With a DRX cycle configured, an MTC UE may only monitor the downlink control signaling in subframes of a DRX ON duration per DRX cycle, sleeping with the receiver circuitry switched off (or in reduced consumption mode) in the remaining subframes. DRX cycles having the receiver turned off for longer periods provides greater power savings.

Figure 4:
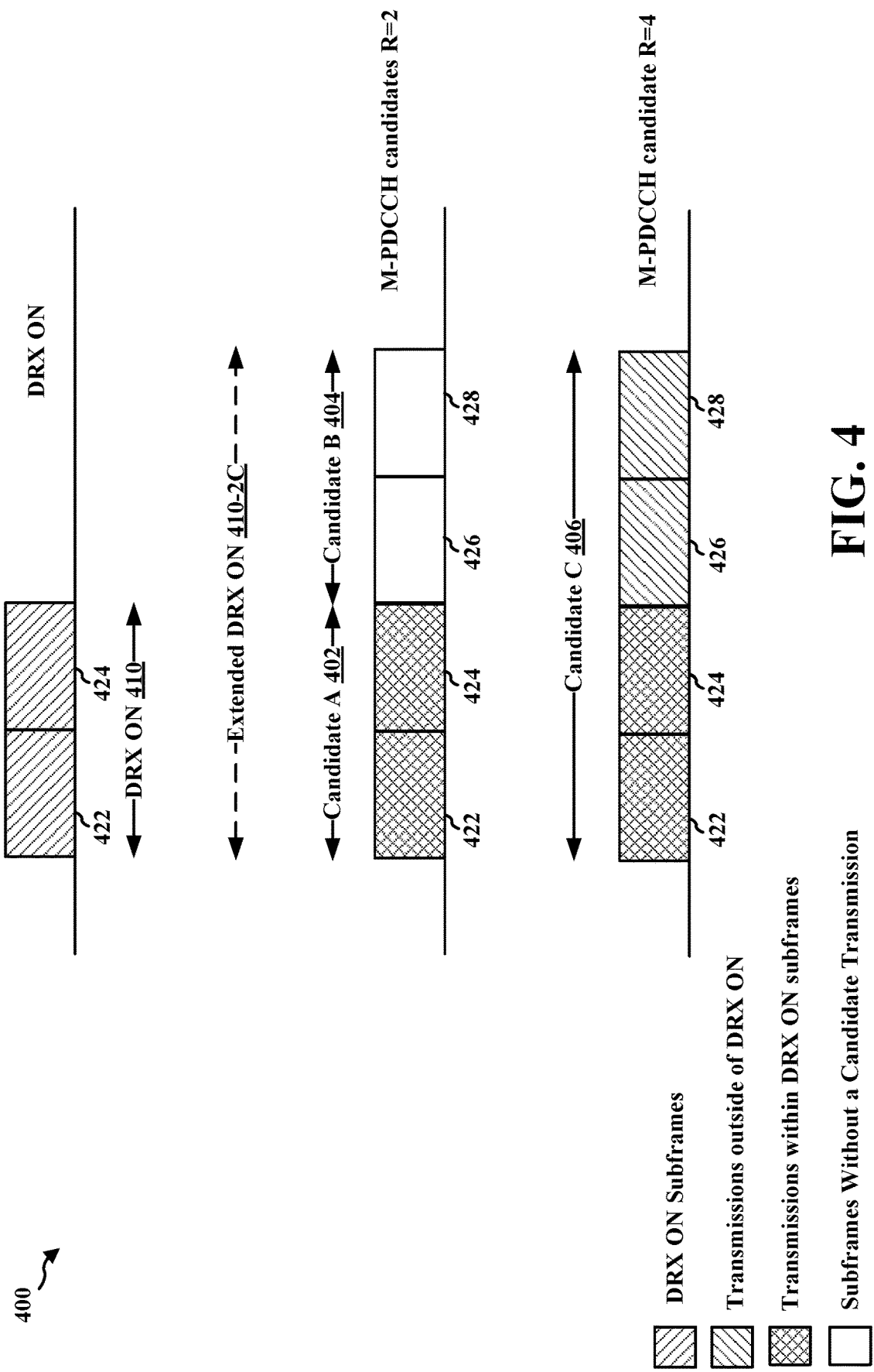
FIG. 4 is an example configuration of M-PDCCH subframes and a DRX ON duration.

Subframes for a bundled M-PDCCH candidate may only partially overlap a DRX ON duration or may fall completely outside a DRX ON duration FIG. 4 is a diagram 400 illustrating a configuration of a DRX ON duration and multiple M-PDCCH candidates for an MTC UE. In this example, as shown, subframes 422, 424, 426, 428 are 4 consecutive subframes in the time domain. Further, an MTC UE may be configured with a DRX ON duration overlapping one or more subframes in a DRX cycle. In this example, a DRX ON duration 410 overlaps with 2 subframes (e.g., the subframe 422 and the subframe 424).

M-PDCCH candidate A 402 with repetition level 2 comprises subframe 422 and the subframe 424, and therefore, is located wholly within DRX ON 410.

M-PDCCH candidate B 404 with repetition level 2 comprises subframe 426 and the subframe 428. M-PDCCH candidate B 404 falls wholly outside DRX ON 410.

M-PDCCH candidate C 406 with repetition level 4 comprises subframes 422, 424, 426, 428. Thus, M-PDCCH candidate C 406 is partially within DRX ON 410 (for subframes 422 and 424) and falls partially outside DRX ON 410 (for subframes 426 and 428).

Figure 5:
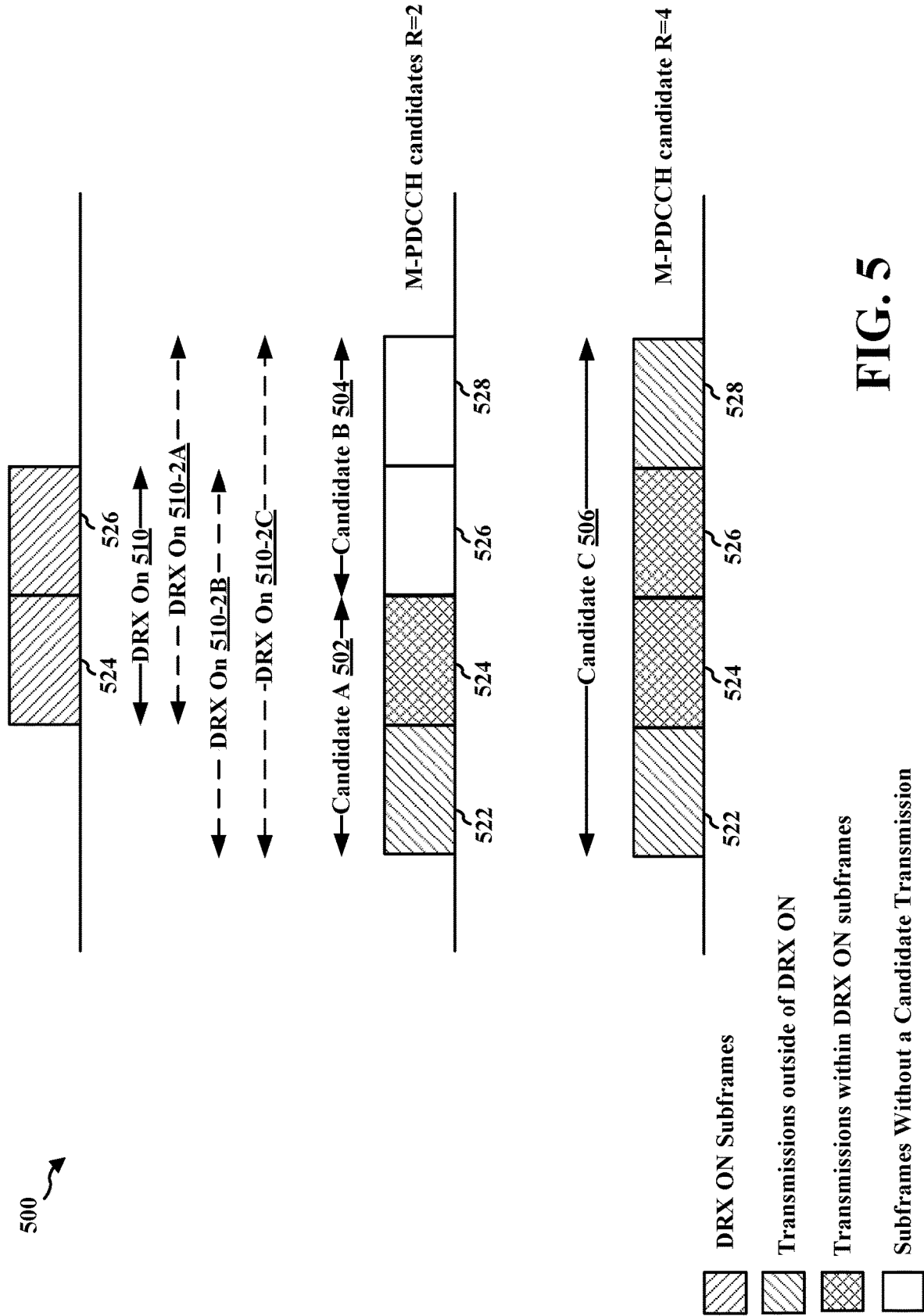
FIG. 5 is an example configuration of M-PDCCH subframes and a DRX ON duration.

FIG. 5 is a diagram 500 illustrating another example configuration of a DRX ON duration and multiple M-PDCCH candidates for an MTC UE. In this example, as shown, subframes 522, 524, 526, 528 are 4 consecutive subframes in the time domain. Further, in this example, a DRX ON duration 510 overlaps with 2 subframes (e.g., the subframe 524 and the subframe 526). In contrast to the example in FIG. 4, the beginning of the DRX ON duration 510 is offset with respect to the beginning subframes of the M-PDCCH candidates.

M-PDCCH candidate A 502 with repetition level 2 comprises subframe 522 and the subframe 524. M-PDCCH candidate B 504 with repetition level 2 comprises subframe 526 and the subframe 528. M-PDCCH candidate C 506 with repetition level 4 comprises subframes 522, 524, 526, 528.

In this example, the M-PDCCH candidate A 502 is partially within the DRX ON duration 510 (e.g., in the subframe 524) and is partially outside the DRX ON duration 510 (e.g., in the subframe 522). The M-PDCCH candidate B 504 is partially within the DRX ON duration 510 (e.g., in the subframe 526) and is partially outside the DRX ON duration 510 (e.g., in the subframe 528). The M-PDCCH candidate C 506 is partially within the DRX ON duration 510 (e.g., in the subframe 524 and the subframe 526) and is partially outside the DRX ON duration 510 (e.g., in the subframe 522 and the subframe 528).

Therefore, in FIG. 5, none of the M-PDCCH candidates is wholly within the DRX ON duration. Instead, each of the M-PDCCH candidates has at least one subframe outside of the DRX ON duration 510.

Figure 6:
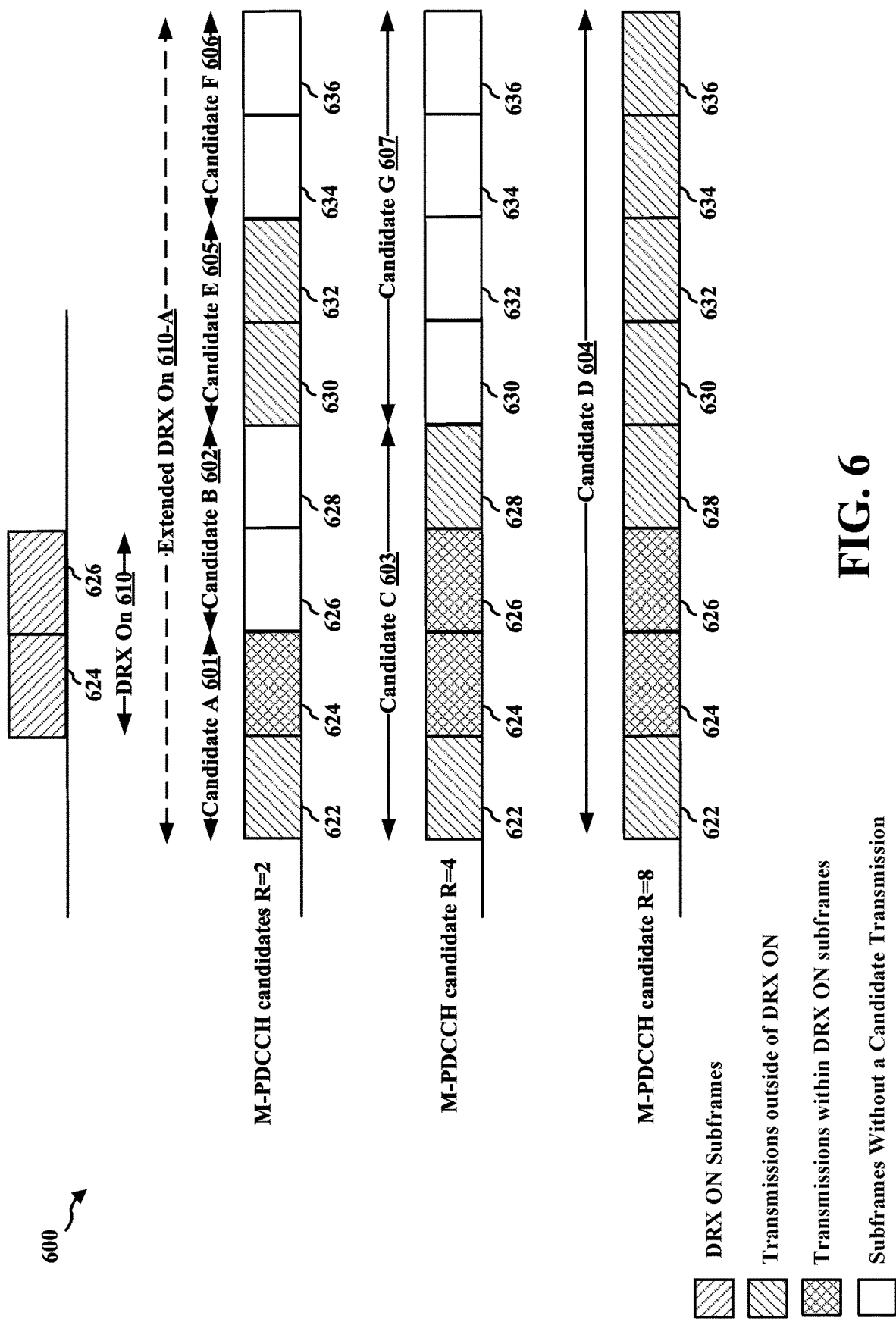
FIG. 6 is an example configuration of M-PDCCH subframes and a DRX ON duration.

FIG. 6 illustrates another example 600 showing subframes 622, 624, 636, 628, 630, 632, 634, and 636. DRX ON duration 610 spans subframes 624 and 626. FIG. 6 illustrates multiple M-PDCCH candidates having 2 repetitions, i.e., Candidate A 601, Candidate B 602, Candidate E 605 and Candidate F 606. FIG. 6 illustrates multiple M-PDCCH candidates having 4 repetitions, i.e., Candidate C 603, Candidate G 607. Candidate D 604 has a repetition of 8 subframes.

An MTC UE may be configured in a number of ways to address the challenge of partial overlap with bundled M-PDCCH candidates and DRX ON durations.

Decode Only Candidates Fully within DRX ON

In a first example, an MTC UE may be configured to decode only an M-PDCCH candidate which is entirely contained in the DRX ON duration. Accordingly, for the example illustrated in FIG. 4, the MTC UE may decode M-PDCCH candidate A 402, because the subframe set carrying M-PDCCH candidate A 402 (e.g., the subframe 422 and the subframe 424) is entirely within the DRX ON duration 410. The MTC UE may refrain from decoding M-PDCCH candidate B 404 and the M-PDCCH candidate C 406, because the subframe sets carrying these M-PDCCH candidates B 704 extend outside the DRX ON duration 410. For the example illustrated in FIG. 5, the MTC UE would not decode any of the M-PDCCH candidates 503, 504, 506, because these M-PDCCH candidates each comprise at least one subframe outside the DRX ON duration 510. In FIG. 6, the UE would not decode any of the M-PDCCH candidates, because none fall completely within DRX ON 610.

Decode Candidates Partially within DRX ON

In a second example, an MTC UE may be configured to decode M-PDCCH candidates having subframes that are least partially within the DRX ON duration.

The MTC UE may be configured to decode only an M-PDCCH candidate which starts within the DRX ON duration 410 and is at least partially within the DRX ON duration 410. Accordingly, for the example illustrated in FIG. 4, the MTC UE may decode M-PDCCH candidate A 402 and the M-PDCCH candidate C 406. The subframe sets carrying M-PDCCH candidate A 402 and the M-PDCCH candidate C 406 both start within the DRX ON duration 410 (e.g., at subframe 422). The MTC UE may refrain from decoding M-PDCCH candidate B 404, because the subframe set carrying M-PDCCH candidate B 404 does not start within the DRX ON duration and does not partially overlap DRX ON duration 410. For the example illustrated in FIG. 5, the MTC UE may decode M-PDCCH candidate B 504. The subframe set carrying the M-PDCCH candidate B 504 starts within the DRX ON duration 510 (e.g., at the subframe 526) and is partially within the DRX ON duration 510. The MTC UE may refrain from decoding M-PDCCH candidate A 502 and the M-PDCCH candidate C 506, because the subframe sets carrying the M-PDCCH candidate A 502 and the M-PDCCH candidate C 506 each start outside DRX ON duration 510. In FIG. 6, the UE would only decode Candidate B 602, which begins within DRX ON 610.

The MTC UE may instead be configured to decode only M-PDCCH candidates which end within the DRX ON duration and that are at least partially within the DRX ON duration. Accordingly, for the example illustrated in FIG. 4, the MTC UE may decode M-PDCCH candidate A 402, because the subframe set carrying the M-PDCCH candidate A 402 ends within the DRX ON duration 410 (e.g., at subframe 424). The MTC UE may refrain from decoding M-PDCCH candidate B 404 and M-PDCCH candidate C 406, because the subframe sets carrying these M-PDCCH candidates C each end outside DRX ON duration 410. For the example illustrated in FIG. 5, the MTC UE may decode M-PDCCH candidate A 502, as the subframe set carrying the M-PDCCH candidate A 502 ends within the DRX ON duration 510 (e.g., at subframe 524). The MTC UE may refrain from decoding M-PDCCH candidate B 504 and the M-PDCCH candidate C 506, as the subframe sets carrying these M-PDCCH candidates B 804 end outside of DRX ON duration 510. In FIG. 6, the UE would decode only Candidate A 601, which ends during DRX ON 610.

The MTC UE may instead be configured to decode any M-PDCCH candidate which is at least partially within the DRX ON duration. Accordingly, for the example illustrated in FIG. 4, the MTC UE may decode M-PDCCH candidate A 402 and the M-PDCCH candidate C 406. The subframe sets carrying the M-PDCCH candidate A 402 and the M-PDCCH candidate C 406 are both at least partially within the DRX ON duration 410. The MTC UE may refrain from decoding M-PDCCH candidate B 404, because the subframe set carrying the M-PDCCH candidate B 404 is not at least partially within the original DRX ON duration 410. For the example illustrated in FIG. 5, the MTC UE may decode each of M-PDCCH candidates A 502, M-PDCCH candidate B 504, and M-PDCCH candidate C 506, as these M-PDCCH candidates each comprise at least one subframe within DRX ON 510. In FIG. 6, the UE may decode each of Candidate A 601, Candidate B 602, Candidate C 603, and Candidate D 604.

The MTC UE may be configured to select among multiple candidates that at least partially overlap with the DRX ON duration. For example, if the respective subframe set carrying each of multiple M-PDCCH candidates has the same length and is at least partially within the DRX ON duration, an MTC UE may be configured to select one or more of multiple M-PDCCH candidates to decode based on a rule. The rule may cause the UE to select a first M-PDCCH candidate, or may cause the UE to select an M-PDCCH candidate that has a higher amount of overlap with the DRX ON duration. For example, in FIG. 6, the UE may select one of Candidate A 601, Candidate B 602, Candidate C 603, and Candidate D 604.

Extend the DRX ON Duration

In a third example, an MTC UE may be configured to extend the start or the end of the DRX ON duration to decode an M-PDCCH candidate a subframe set carrying which is at least partially within the original DRX ON duration. Further, any M-PDCCH candidates that are also carried by the subframe sets within the extended DRX ON duration may be also decoded by the MTC UE.

Accordingly, for the example illustrated in FIG. 4, the MTC UE may decode M-PDCCH candidate A 402 and the M-PDCCH candidate C 406. M-PDCCH candidate C 406 has subframes 422 and 424 that fall within DRX ON 410. Therefore, the UE may determine to extend DRX ON 410 to length extended DRX ON 410-2C that includes subframes 426 and 428 so that each of the subframes of M-PDCCH candidate C 406 are contained within the extended DRX ON duration 410-2C. FIG. 6 illustrates that DRX ON 610 may be extended to an extended DRX ON 601-A, to include all of the subframes of Candidate D 604, which had subframes 624, 626 within original DRX ON 610.

The MTC UE may determine that the subframes 422, 424, 426, 428 within the DRX ON duration 410 also carries all of the subframes of M-PDCCH candidate B 404. Accordingly, the MTC UE may also decodes the M-PDCCH candidate B 404.

For the example illustrated in FIG. 5, the MTC UE partially overlaps each of M-PDCCH candidates 502, 504, 506. Therefore, the MTC UE may have its DRX ON extended to configured include each of subframes 522, 524, 526, and 528 and may decode each of M-PDCCH candidates 502, 504, 506. The end of the DRX ON duration may be extended, as in DRX ON 510-2A. The beginning of the DRX ON duration may be extended, as in extended DRX ON 510-2B. The beginning and the end of the DRX ON duration may be extended, as in 510-2C.

Inactivity Timer

Similar issues may arise with respect to an inactivity timer. If a UE decodes a PDCCH in a certain subframe, the UE can typically go to DRX after a defined number, e.g., M, of subframes without M-PDCCH decoding. This is called an inactivity timer, and the M subframes are considered inactive. In legacy LTE, the PDCCH/ePDCCH are not bundled, and M can be counted in terms of valid control subframes, i.e., subframes in which the UE can monitor PDCCH. This value may be as small as 1. However, in eMTC, the control channel may use a number of repetitions in a number of subframes. The number of repetitions may be variable, e.g., the UE may need to monitor R=2, 4, 8 repetitions. Therefore, when a UE receives a partial bundled control channel, the UE needs to determine whether to consider the partial receipt of the M-PDCCH an inactive subframe. If the UE does not consider the partial receipt of the M-PDCCH to be an inactive subframe, the UE must begin counting toward M inactive subframes before going to DRX.

Therefore, rather than determining whether to decode an M-PDCCH in the examples above, the UE may determine whether to consider the M-PDCCH as having been received and reset the inactivity timer.

Align DRX ON with M-PDCCH Monitoring

As described supra, the DRX ON cycle might not be aligned with starting subframes for M-PDCCH, because the M-PDCCH subframes are defined separately from DRX. The UE may address this difference in alignment in a way to reduce partially overlapped M-PDCCH subframes. The MTC UE may be configured to start a DRX ON duration at an MPDCCH starting subframe (i.e., the initial subframe for M-PDCCH monitoring).

More specifically, for an MTC UE without DRX configured, the MPDCCH starting subframe follows a pattern from a given reference subframe. For example, the pattern may be determined based on the repetition levels of the M-PDCCH candidates that are monitored by the MTC UE. In one example, the MTC UE monitors M-PDCCH candidates with repetition levels 2, 4, and 8. The MTC UE may determine the pattern based on the largest repetition level. Thus, the MTC UE may start the M-PDCCH monitoring process every eighth subframe starting from a particular subframe (e.g., frame 0, subframe 0)

For MTC UEs with DRX, the M-PDCCH starting subframe follows a pattern from a given reference subframe, where the reference subframe may be the starting subframe of the DRX ON duration. If the starting subframe of the DRX ON duration is not valid, the MTC UE will adjust the starting subframe of the DRX ON duration to the next or previously valid.

Figure 7:
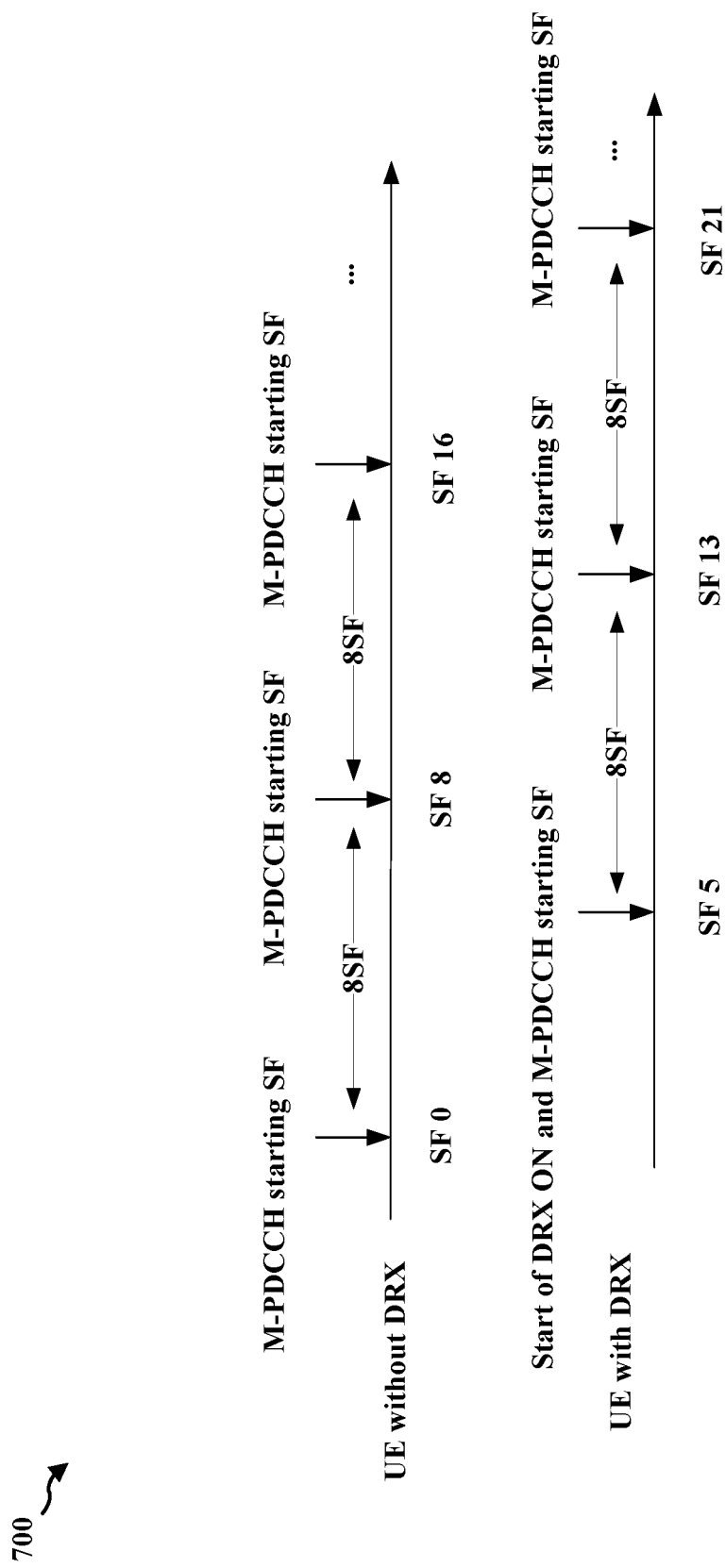
FIG. 7 is an example configuration of M-PDCCH subframes and a DRX ON duration.

FIG. 7 is a diagram 700 illustrating a configuration of a DRX ON duration and M-PDCCH starting subframes for an MTC UE. In this example, an MTC UE without DRX configured and monitoring M-PDCCH with repetition levels 2, 4, and 8 may start first, second, and third M-PDCCH monitoring processes at subframe 0, subframe 8, and subframe 16, respectively. An MTC UE with DRX configured and monitoring M-PDCCH with repetition levels 2, 4, and 8 may start first, second, and third M-PDCCH monitoring processes at subframe 5, subframe 13, and subframe 21, respectively. In this example, subframe 5 is also the start of a DRX ON duration of the MTC UE.

DRX Parameters as a Function of M-PDCCH Parameters

An MTC UE may be configured to determine DRX configuration parameters based on M-PDCCH configurations. For example, DRX parameters such as a DRX ON duration or other aspects of a DRX cycle may be defined as a function of a reference subframe set, which is used to carry an M-PDCCH candidate with a selected repetition level. For example, when the MTC UE monitors M-PDCCH candidates with repetition levels of 2, 4, and 8, the MTC UE may select the subframe set used to carry an M-PDCCH candidate with repetition level 8 (i.e., the largest repetition level in this example) including 8 subframes as the reference subframe set. The DRX ON duration may be configured as a first integer number of starting M-PDCCH monitoring subframes.

In another example, the DRX ON duration may be configured with a first number of subframes and the DRX cycle may be configured with a second number of subframes. The MTC UE, however, may further adjust the DRX ON duration to start at the beginning of a reference subframe set that is before, after, or closer to the original start of the DRX ON duration.

Figure 8:
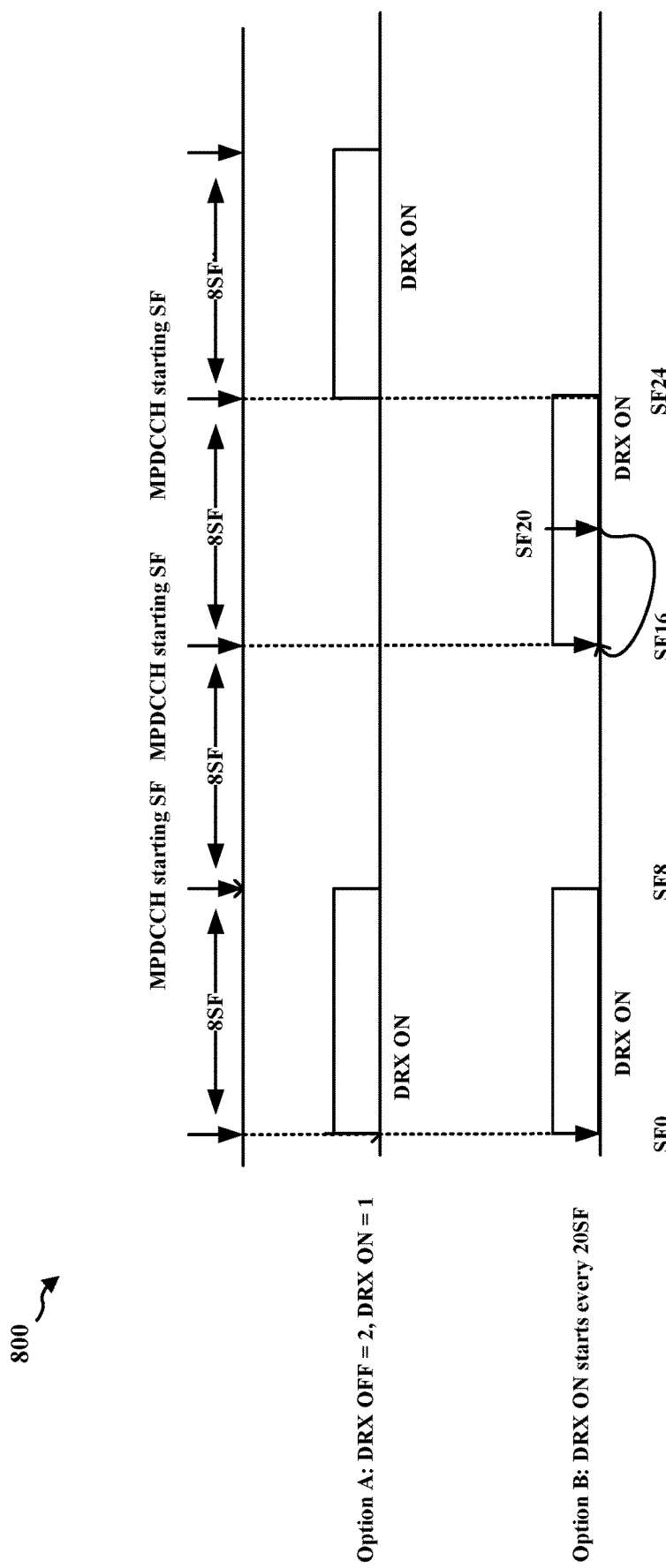
FIG. 8 is an example configuration of M-PDCCH subframes and a DRX ON duration.

FIG. 8 is a diagram 800 illustrating another configuration of a DRX ON duration and M-PDCCH starting subframes for an MTC UE. In this example, as shown, an MTC UE in compliance with option A may be configured with a DRX ON duration of 1 reference subframe set and a DRX cycle of 3 reference subframe sets (i.e., a DRX OFF duration of 2 reference subframe sets). In this example as described supra, a reference subframe set includes 8 subframes and starts at subframe 0. Accordingly, the DRX ON duration starts at subframe 0 and ends at subframe 7. The DRX OFF duration starts at subframe 8 and ends at subframe 23. Subsequently the DRX ON duration starts again at subframe 24 for 8 subframes.

In this example, an MTC UE in compliance with option B may be configured with a DRX ON duration of 8 subframes and a DRX cycle of 20 subframes. As described supra, a reference subframe set includes 8 subframes and starts at subframe 0. The DRX ON duration starts at subframe 0 and ends at subframe 7. According to the DRX configuration, the next DRX ON duration should start at subframe 20. The MTC UE in this example determines that subframe 20 is within a reference subframe set starting at subframe 16 and ending at subframe 23. The MTC UE may determine to start the DRX ON duration at the start of the current reference subframe set (e.g., at subframe 16). The MTC UE may determine to start the DRX ON duration at the start of the next reference subframe set (e.g., at subframe 24). Further, the MTC UE may determine to start the DRX ON duration at the start of a reference subframe set, where the start is the closest to the originally configured start (e.g., subframe 20). In this example, the start of the current subframe set (i.e., subframe 16) and the start of the next subframe set (i.e., subframe 24) have the same distance to the originally configured start (e.g., subframe 20). The MTC UE may select the start of the DRX ON duration based on a rule. For example, the MTC UE may select the earlier start (i.e., subframe 16) or may implement an alternative rule (and select the later start (i.e., subframe 24)).

In another example, an M-PDCCH parameter may be used to determine a DRX ON duration. An MTC UE may be configured with a DRX ON duration timer that uses a PDCCH subframe (PSF) number to determine the DRX ON duration. The PSF number indicates the number of reference subframe set described supra during which a UE should be awake and monitor for PDCCH/ePDCCH. An MTC UE may determine a DRX ON duration for which it monitors for M-PDCCH as a function of a repetition level of M-PDCCH candidates.

For example, the reference subframe set may be determined based on the smallest repetition level, the largest repetition level, or all of the repetition levels of the M-PDCCH candidates that are monitored by the MTC UE. In this example, when the MTC UE monitors M-PDCCH candidates with repetition levels 2, 4, and 8 and the reference subframe set is based on the largest repetition level. The MTC UE may be configured with PSF 3. Therefore, the MTC UE may determine a DRX ON duration as $$DRX\ ON = \text{maximum repetition level for M-PDCCH} * PSF$$

In this example, the DRX ON causes the MTC UE to monitor M-PDCCH for 24 valid subframes (i.e., 3 times 8 subframes) after the DRX ON duration starts, which allows the MTC UE to decode 3 M-PDCCH candidates of the largest repetition level.

In another example, the DRX ON duration timer may be configured with PSF X. The MTC UE may interpret that the PSF X instructs the MTC UE to at least decode X number of M-PDCCH candidates. For example, if the MTC UE monitors M-PDCCH candidates with repetition levels 2 and 4, the DRX ON duration timer configured with PSF 2 instructs the MTC UE to decode at least 2 M-PDCCH candidates (one with repetition level 2 and one with repetition level 4 in this example). As such, the MTC UE stays awake and decodes 4 subframes.

An MTC UE may be configured to go to DRX OFF mode (sleep) earlier if the MTC UE does not expect a grant in the remaining DRX ON duration. Referring back to FIG. 5, the MTC UE monitors the M-PDCCH candidate A 502, the M-PDCCH candidate B 404, and the M-PDCCH candidate C 506. This MTC UE may perform an early detection of M-PDCCH candidate C 506 in subframe 524. The MTC UE may decide to go to DRX OFF mode upon successfully decoding the M-PDCCH candidate C 506, as the MTC UE may determine that the M-PDCCH candidate B 504 does not exist because the M-PDCCH candidate B 504 fully overlaps with M-PDCCH candidate C 506.

CSI Measurements for MTC with DRX

When an MTC UE is in coverage enhanced mode, the MTC UE may measure reference symbols in a group of reference subframes (e.g., 4, 6, or 8 subframes) to determine CSI feedback. In low SNR and narrowband situations, one subframe may not be sufficient to provide accurate CSI measurements. It may be possible, however, that an MTC UE is requested to provide CSI feedback in a subframe (e.g., subframe N) and that one or more subframes of the group of corresponding reference subframes (e.g., subframes (N−7) to (N−4)) to be measured are located in the DRX OFF duration.

Figure 9:
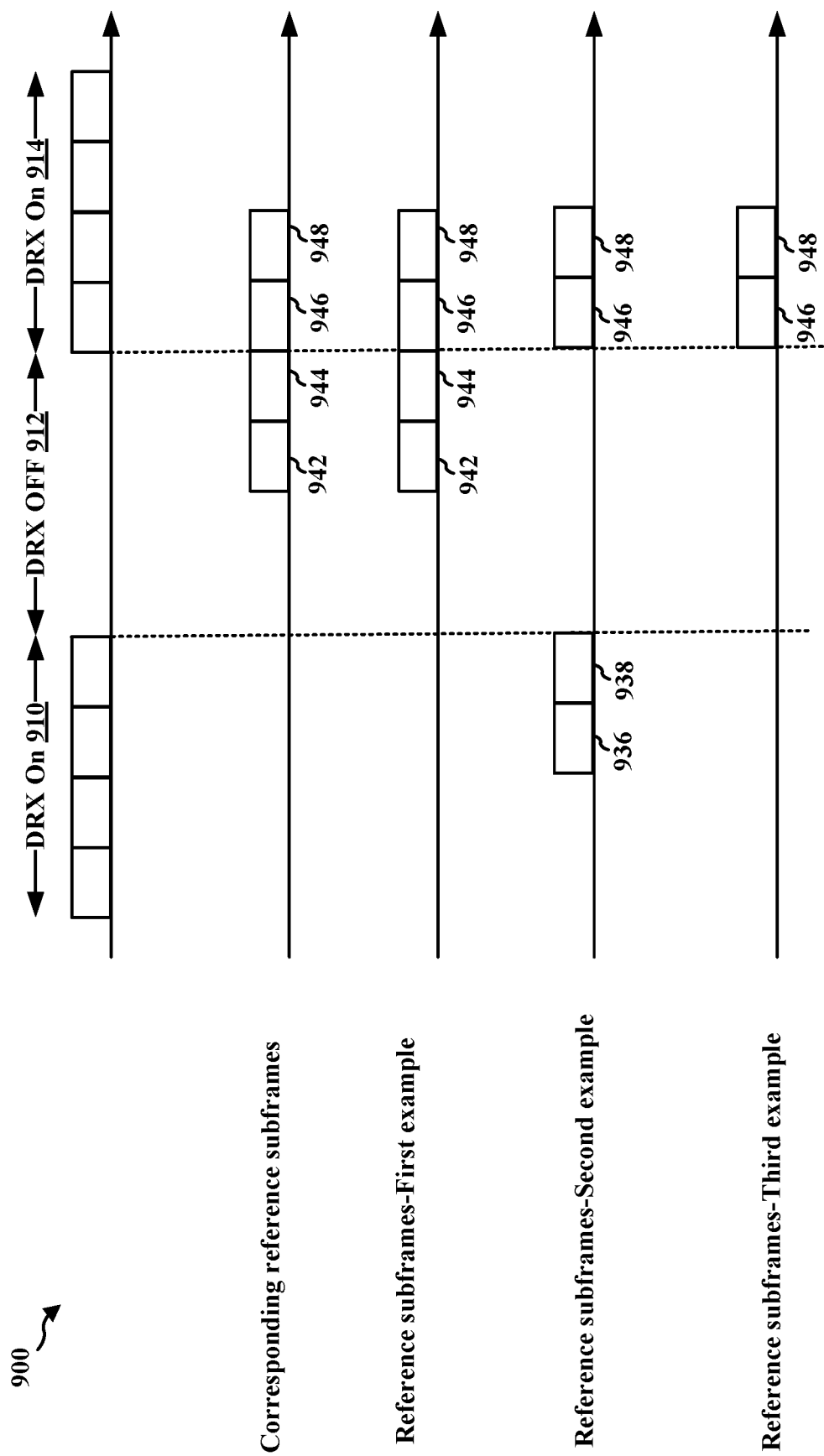
FIG. 9 is an example configuration of CSI reference subframes and DRX cycle.

FIG. 9 is a diagram 900 illustrating configurations of a DRX cycle and CSI reference subframes for a MTC UE. In this example, an MTC UE is configured with a DRX ON duration 910, a DRX OFF duration 912, and a DRX ON duration 914 that are consecutive. Further, for transmitting CSI feedback at a particular subframe, the group of corresponding reference subframes includes subframes 942, 944, 946, 948. Further, the subframe 942 and the subframe 944 are in the DRX OFF duration 912. The subframe 946 and the subframe 948 are in the DRX ON duration 914.

In a first example, when some subframes of the group of corresponding reference subframes are outside the DRX ON duration, the MTC UE may wake up earlier to measure each subframe of the group of corresponding reference subframes to determine CSI feedback. In FIG. 9, the MTC UE may extend the DRX ON duration 914 to include the subframe 942 and the subframe 944. Accordingly, the MTC UE can measure the subframes 942, 944, 946, 948 to generate the CSI feedback.

In a second example, when some subframes of the group of corresponding reference subframes are outside the DRX ON duration and the DRX OFF duration does not exceed a threshold (e.g., 4 subframes, 8 subframes), the MTC UE may substitute the corresponding reference subframes in the DRX OFF duration with the same number of subframes in the previous DRX ON duration. In FIG. 9, the MTC UE may determine that the DRX OFF duration 912 does not exceed the threshold. Accordingly, the MTC UE may select the subframe 936 and the subframe 938 to replace the subframe 942 and the subframe 944, which are in the DRX OFF duration 912. For example, the subframe 936 and the subframe 938 may be the last two subframes in the DRX ON duration 910. Accordingly, the MTC UE can measure the subframe 936, the subframe 938, the subframe 946, and the subframe 948 to generate the CSI feedback.

In a third example, when the group of corresponding reference subframes is partially overlapped with the DRX ON duration, the UE may measure the subframes of the group of corresponding reference subframes that are inside the DRX ON duration to generate CSI feedback. In FIG. 9, the MTC UE may measure the subframe 946 and the subframe 948, which are in the DRX ON duration 914, to generate the CSI feedback.

In a fourth example, when the group of corresponding reference subframes is partially overlapped with the DRX ON duration, the MTC UE may refrain from measuring the reference subframes to generate CSI feedback. Additionally, the MTC UE may refrain from transmitting CSI feedback or may transmit a default or previous CSI value. In this example, when the group of corresponding reference subframes are partially overlapped with the DRX ON duration, the MTC UE determines a percentage of the subframes of the group that are in the DRX OFF duration. Further, if the percentage exceeds a threshold, the MTC UE may decide not to measure the reference subframes to generate CSI feedback. For example, if the group of corresponding reference subframes include 4 subframes, the MTC UE measures the subframes in the DRX ON duration when there are the 2 or more subframes of the group in the DRX ON duration.

An MTC UE may determine the subframe number described supra based on absolute subframe number or valid subframe number. Further, the MTC UE may use various combinations of absolute subframe number and valid subframe number to determine various subframe numbers. For example, the MTC UE may use absolute subframe number to determine starting subframe of a DRX ON duration and may use valid subframe number to determine the DRX ON duration (the DRX ON duration timer).

SPS for MTC with DRX

In another aspect, an eNB may use SPS to schedule DL or UL transmission with an MTC UE. An eNB typically transmits an RRC configuration with SPS. The UE receives the SPS activation grant and then transmits or receives according to the grant until an SPS deactivation grant is received or a maximum number of empty packets are transmitted. The SPS can be configured with different periodicities. As described supra, the MTC UE may be half duplex and may operate in a narrowband. Consequently, in certain circumstances, after activating SPS, the MTC UE may not be able to continuously monitor M-PDCCH to detect SPS deactivation message or other types of signaling.

For example, the MTC UE may be configured with an M-PUSCH bundle size of 20 subframes and an M-PDCCH bundle size also of 20 subframes. The UL SPS parameters may configure an M-PUSCH transmission periodicity of 30 subframes. That is, the MTC UE transmits M-PUSCH every 30 subframes (e.g., starting in subframe 0, subframe 30, subframe 60, . . . ). As such, the gap between two consecutive M-PUSCH transmissions is 10 subframes (e.g., subframes 20-29). The MTC UE may use the gap to decode M-PDCCH. In this example, the M-PDCCH bundle size is 20 subframes, and the gap between M-PUSCH transmissions does not provide sufficient time for the MTC UE to decode an M-PDCCH bundle size of 20 subframes. Therefore, the MTC UE may not be able to receive the SPS deactivation message transmitted on the M-PDCCH. This issue may also occur with UL SPS or DL/UL SPS.

To address these issues, an eNB scheduler may be implemented to select SPS parameters that provide a sufficient time period for decoding an M-PDCCH bundle between two SPS transmissions. The SPS parameters for UL (or DL) such as SPS periodicity and transmission bundle size may be determined based on desired bundle size, bundle size for M-PDCCH, M-PDCCH starting subframes, and SPS parameters for DL (or UL).

In another example, an MTC UE may interpret the SPS parameters (e.g., periodicity) received from the eNodeB as a function of the bundle size of one or more channels. For example, when the SPS parameters indicate an M-PUSCH periodicity of 10 subframes and an M-PUSCH bundle size of 1 subframe, the MTC UE may determine that the M-PUSCH periodicity to be used is 10 subframes (i.e., 10 times 1). When the SPS parameters indicate an M-PUSCH periodicity of 10 subframes and an M-PUSCH bundle size of 4 subframes, the MTC UE may determine the M-PUSCH periodicity to be used is 40 subframes (i.e., 10 times 4). As such, the gap between two SPS transmission may provide a sufficient time period for the MTC UE to decode M-PDCCH.

Further, the MTC UE may not monitor M-PDCCH while transmitting an SPS M-PUSCH or receiving an M-PDSCH.

Invalid Subframes

In yet another aspect, when the MTC UE is using SPS, the subframe for which the MTC UE receives an SPS grant may not be available for UL/DL transmission.

To address this issue, the MTC UE may postpone the transmission scheduled for the subframes not available. For example, a bundled transmission between the MTC UE and the eNB may be allocated with subframes 0, 1, and 2. In this example, due to SPS transmission, the subframe 1 may not be available. The UE may postpone the transmission allocated for the subframes 1 and 2 to subframes 2 and 3. That is, instead of transmitting at subframes 0, 1, and 2, the transmitter transmits the bundle at subframes 0, 2, and 3.

In another example, the MTC UE may drop the transmission allocated with a subframe that is not available. For example, a bundled transmission between the MTC UE and the eNB may be allocated with subframes 0, 1, and 2. Due to SPS transmission, the subframe 1 is not available. The UE may accordingly drop the transmission allocated for the subframe 1. That is, the MTC UE transmits at subframes 0 and 2, but not at subframe 1. Further, the MTC UE may dynamically reduce the repetition level based on the dropped subframes. For example, if the repetition level is 8, and the MTC UE drop 2 frames, then the MTC UE now assumes a repetition of 6.

In another example, the MTC UE may drop the entire transmission when a subframe allocated for the transmission is not available. For example, a bundled transmission between the MTC UE and the eNB may be allocated with subframes 0, 1, and 2. Due to SPS transmission, the subframe 1 is not available. The MCT UE may accordingly drop the entire transmission. That is, the MTC UE does not transmit at any of the subframes 0, 1 or 2.

The MTC UE may select among these different options. For example, the MTC UE may determine to drop the entire transmission when the initial (first) subframe allocated for the transmission is not available. If a subsequent subframe allocated for the transmission is not available, the MTC UE may postpone the transmissions allocated for the unavailable subframe and subsequent subframes. Alternatively, the MTC UE may drop transmission allocated for the unavailable subframe. For example, a bundled transmission between the MTC UE and the eNodeB may be allocated with subframes 0, 1, and 2. If subframe 1 is not available, the MTC UE may drop the transmission in subframe 1. If subframe 0 is not available, the MTC UE may drop the entire transmission.

In another example, with respect to not-bundled transmission or small-bundle (e.g., less than 3 or 5 subframes) transmission, the MTC may select one of these examples. The MTC UE may select a different example for large-bundle (e.g., greater than 4 subframes) transmission.

HARQ ID Determination

For UL HARQ, the HARQ process ID assigned to a particular M-PUSCH may be determined based on an M-PDCCH occasion (transmission) that schedules the particular M-PUSCH. For example, when an MTC UE have 2 HARQ processes (HARQ process 0 and HARQ process 1), every other M-PDCCH occasion is associated with HARQ process 0 or HARQ process 1. If the M-PDCCH occasion happens every 10 subframes starting at subframe 0, then the M-PUSCH granted by M-PDCCH in subframes 0-9 and subframes 20-29 uses HARQ process 0. The M-PUSCH granted by M-PDCCH in subframes 10-19 and subframes 30-39 uses HARQ process 1.

Further, after the MTC UE is configured with M-PUSCH SPS, the MTC UE does not receive M-PDCCH during SPS period. The MTC UE may determine a virtual M-PDCCH occasion (transmission) that could have scheduled an M-PUSCH. For an M-PUSCH starting at subframe N, the corresponding virtual M-PDCCH occasion may be determined to start at subframe N-k, where k is the scheduling timing (e.g., 4 subframes). Subsequently, the UE may use the virtual M-PDCCH occasion to determine the HARQ process ID assigned to a particular M-PUSCH as described supra. Further, in one example, the MTC UE may count only valid subframes. In another example, the MTC UE may count all subframes.

Alternatively, the above techniques may be modified such that the HARQ process ID for a particular M-PUSCH is determined based on the starting or end point of the M-PUSCH.

Figure 10:
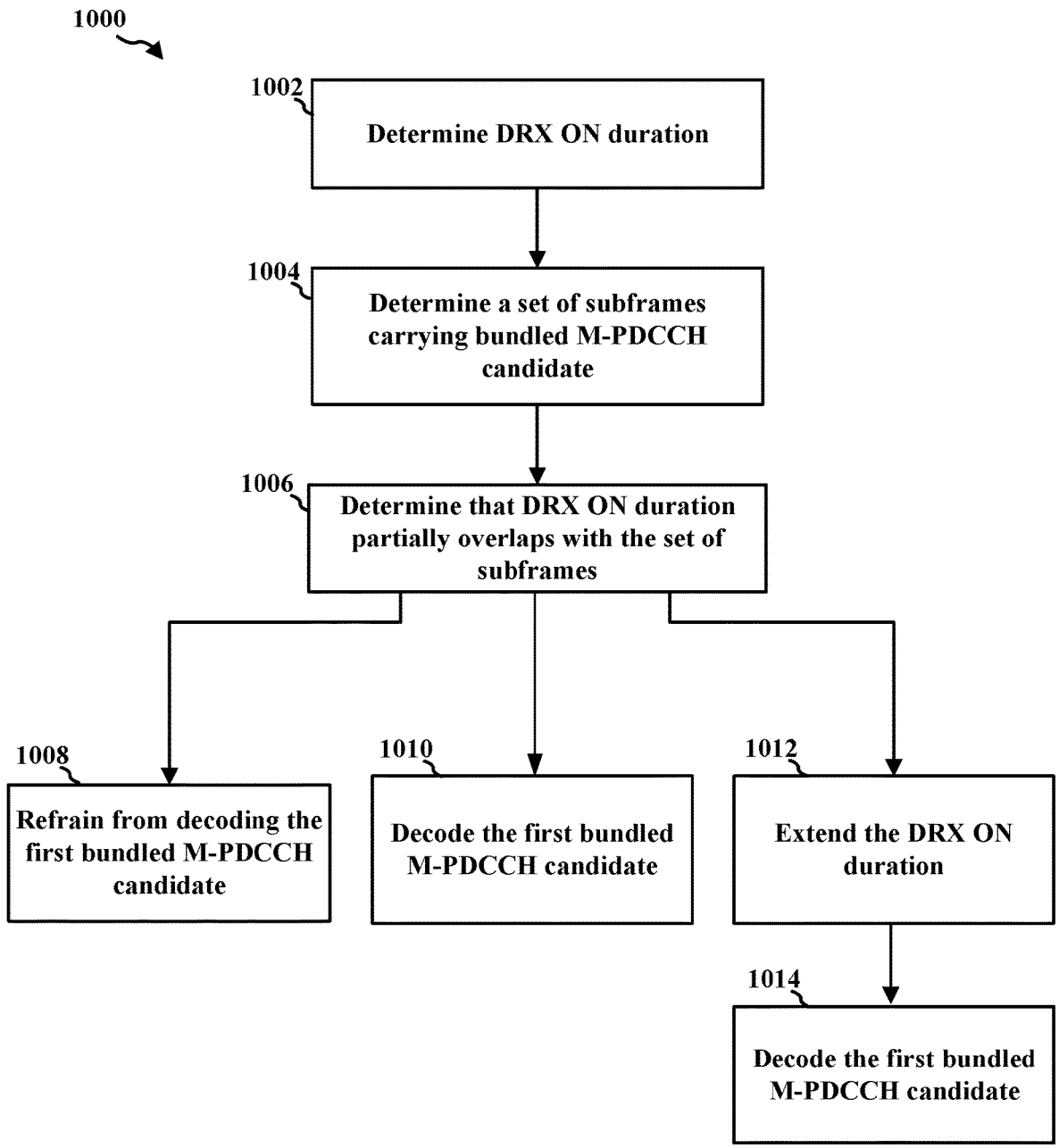
FIG. 10 is a flowchart of a method of wireless communication.

FIG. 10 is a flowchart 1000 of a method of wireless communication. The method may be performed by a UE (e.g., the UE 104, the apparatus 1702/1702'). At 1002, the UE determines a DRX ON duration. For example, the DRX ON duration may be determined based on communication between the UE and an eNB regarding wake up windows during which the UE will power on the receiver to monitor a control channel and allow data transfer with the network.

At 1004, the UE determines a set of subframes carrying a first bundled M-PDCCH candidate, the set of subframes including a plurality of subframes. In eMTC, e.g., channels may be bundled to include multiple repetitions in the time domain. For example, an M-PDCCH may have a repetition level of 2, being repeated in 2 consecutive subframes, a repetition level of 4 being repeated in 4 consecutive subframes, etc. For example, any of M-PDCCH candidates A-G in FIGS. 4-6 are examples of a first M-PDCCH candidate for which the set of subframes may be determined by the UE.

At 1006, the UE determines that the DRX ON duration at least partially overlaps with the set of subframes. FIGS. 4-6 illustrate examples of bundled M-PDCCH candidates that at least partially overlap a DRX ON duration. For example, in FIG. 4, the UE would determine that DRX ON duration 410 overlaps with the complete Candidate A 402 and overlaps partially with Candidate C 406. FIGS. 5 and 6 illustrate other examples of potential overlap between DRX ON duration and M-PDCCH candidates that might be determined by a UE.

The UE may perform any of a number of actions in order to address potential partial overlap of M-PDCCH. The UE may refrain from decoding the first bundled M-PDCCH candidate at 1008. This may occur, e.g., when the UE determines that at least a portion of the subframes of the M-PDCCH candidate are outside of the DRX ON duration.

As another option, the UE may decode the first bundled M-PDCCH candidate at 1010. The UE may decode the first bundled M-PDCCH candidate, e.g., when the M-PDCCH candidate is completely within the DRX ON duration or when the first M-PDCCH candidate is at least partially within the DRX ON duration. The determination regarding whether to decode or to refrain from decoding the first M-PDCCH candidate may be based on additional determinations by the UE, e.g., as illustrated in FIGS. 11 and/or 12.

As a third option, the UE may extend the DRX ON duration at 1012 to include the set of subframes entirely and then decode the first bundled M-PDCCH candidate carried in the set of subframes in the extended DRX ON duration at 1014.

Figure 11:
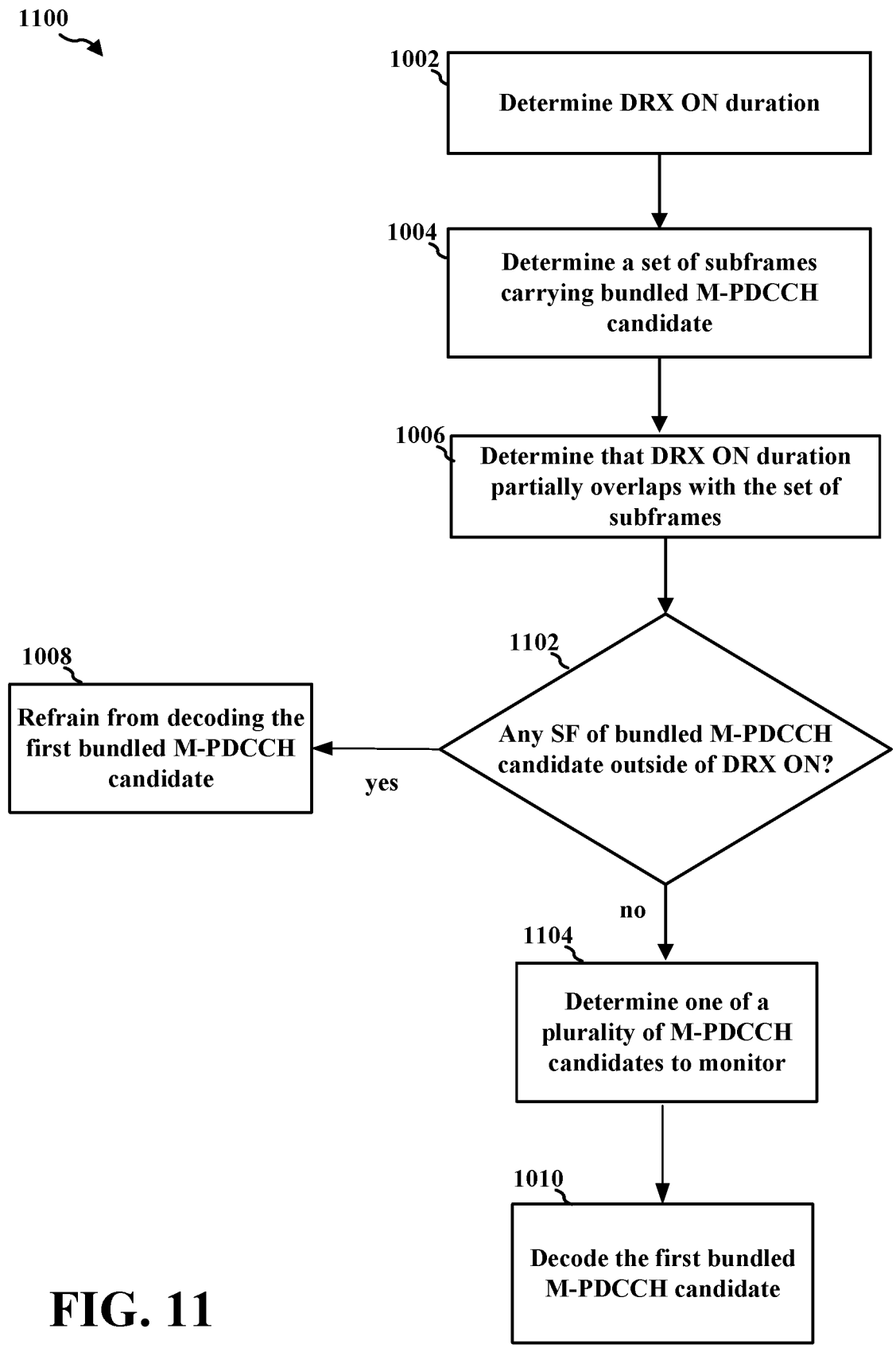
FIG. 11 is a flowchart of a method of wireless communication.

FIG. 11 illustrates an example flowchart 1100 of optional additional aspects that may be performed as part of the method of flowchart 1000. The UE determines the DRX ON duration at 1002 and the set of subframes carrying the first bundled M-PDCCH candidate at 1004, as in FIG. 10. Once the UE determines that the DRX ON duration at least partially overlaps with the set of subframes at 1006, the UE may determine whether the plurality of subframes of the first bundled M-PDCCH candidate are fully within the DRX ON duration at 1102, e.g., by determining whether any subframes of the bundled M-PDCCH candidate are outside of the DRX ON duration. The UE may decode the first bundled M-PDCCH candidate, as illustrated at 1010 in FIGS. 10 and 11, if all of the plurality of subframes of the first bundled M-PDCCH candidate are within the DRX ON duration. On this basis, the UE may determine, e.g., to decode Candidate A in FIG. 4 that is fully within the DRX ON duration 410.

If at least one subframe of the plurality of subframes of the first bundled M-PDCCH candidate is outside of the DRX ON duration, the UE may refrain from decoding the first bundled M-PDCCH candidate at 1008, as illustrated in FIGS. 10 and 11. Thus, the UE may refrain from decoding Candidate C in FIG. 4, which only partially overlaps the DRX ON duration 410. The UE may also refrain from decoding Candidate B in FIG. 4, which is completely outside the DRX ON duration 410. The determination at 1102 may be made without extending the DRX ON duration.

At times, there may be a plurality of bundled M-PDCCH candidates. The UE may determine at 1104 to monitor one of a plurality of bundled M-PDCCH candidates. For example, the UE may determine a set of subframes carrying a second bundled M-PDCCH candidate in addition to the set of subframes carrying the first bundled M-PDCCH candidate. For example FIGS. 4-6 illustrate that there may be multiple M-PDCCH candidates, e.g., Candidates A-G. The UE may determine to monitor the first bundled M-PDCCH candidate based at least on an overlap between the DRX ON duration and the set of subframes of the first bundled M-PDCCH candidate. For example, the UE may select the bundled M-PDCCH candidate having each subframe within the DRX ON duration. Thus, in FIG. 4, the UE may select to decode Candidate A rather than Candidate C, because Candidate A has each subframe within the DRX ON duration 410, whereas Candidate C has subframes outside the DRX ON duration. Once the determination is made, the UE decodes the selected M-PDCCH candidate at 1010.

Figure 12:
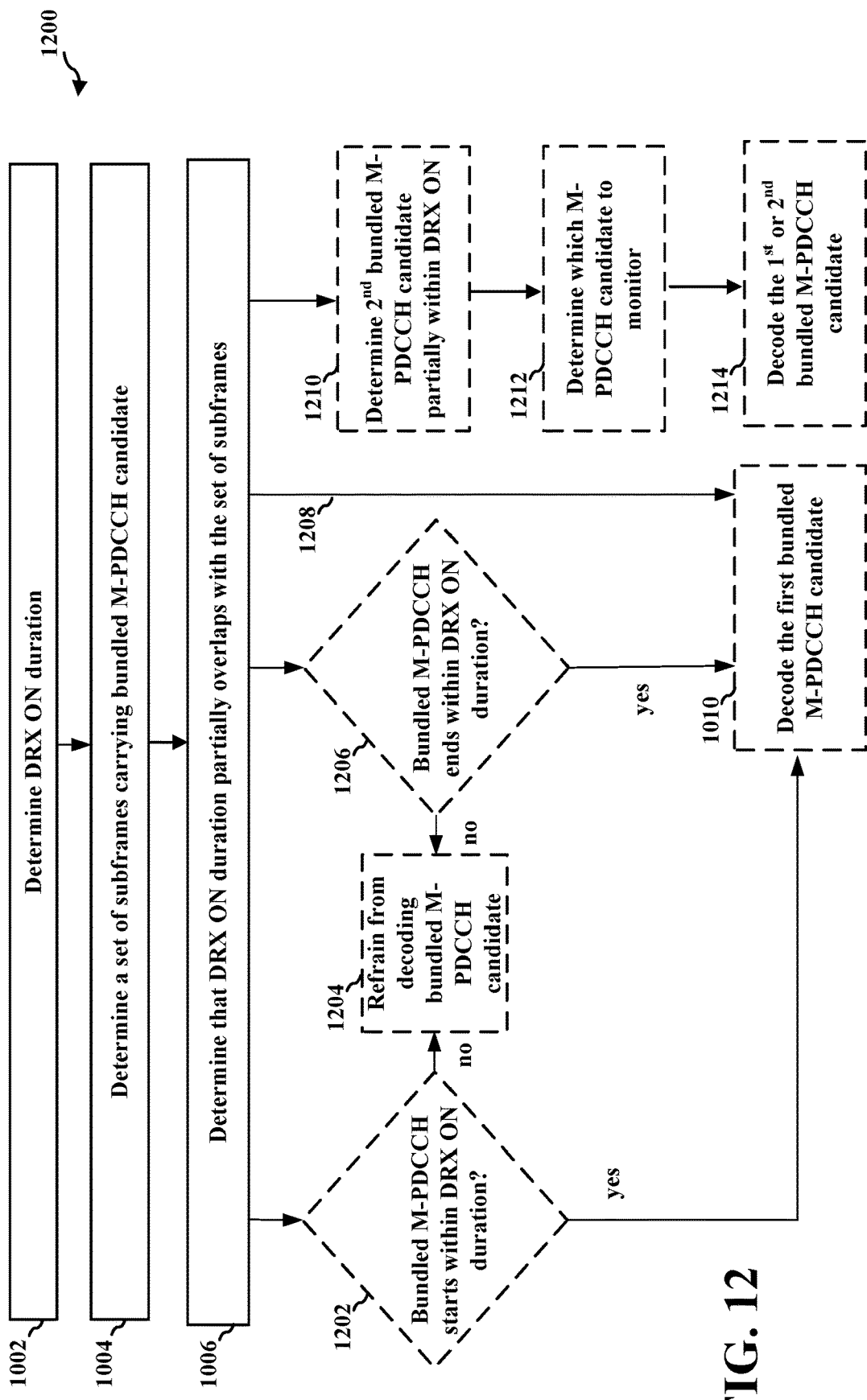
FIG. 12 is a flowchart of a method of wireless communication.

FIG. 12 illustrates another example flowchart 1200 of optional additional aspects that may be performed as part of the method of flowchart 1000. The UE determines the DRX ON duration at 1002 and the set of subframes carrying the first bundled M-PDCCH candidate at 1004, as in FIG. 10. The UE then determines that the DRX ON duration at least partially overlaps with the set of subframes at 1006, the UE may determine, as described in connection with FIG. 10. In this example, the subframes of the first bundled M-PDCCH candidate partially fall outside of the DRX ON duration. For example, once the UE determines that the DRX ON duration at least partially overlaps with the set of subframes at 1006, the UE may determine whether the subframes of the first bundled M-PDCCH candidate start within the DRX ON duration at 1202. The UE may decode the first bundled M-PDCCH candidate at 1010 when the subframes of the first bundled M-PDCCH candidate start within the DRX ON duration. Thus, in FIG. 4, the UE may determine to decode both Candidate A and Candidate C, because both candidates start within the DRX ON duration 410, even though Candidate C has subframes outside DRX ON 410.

The UE may refrain from decoding the first bundled M-PDCCH candidate at 1204 when the subframes do not start within the DRX ON duration. For example, in FIG. 5, the UE may determine that subframes of both Candidate A and Candidate C are outside of DRX ON 510 and that neither Candidate starts within DRX ON 510. Therefore, the UE may refrain from decoding both Candidate A and Candidate C.

In another example, the UE may determine whether the subframes of the first bundled M-PDCCH candidate end within the DRX ON duration at 1206. The UE may decode the first bundled M-PDCCH candidate at 1010 when the subframes of the first bundled M-PDCCH candidate end within the DRX ON duration. The UE may refrain from decoding the first bundled M-PDCCH candidate at 1204 when the subframes do not end within the DRX ON duration. According to this example, the UE may determine to decode Candidate A in FIG. 5, even though subframe 522 of Candidate A is outside DRX ON 510 because Candidate A ends within DRX ON 510. The UE may refrain from decoding Candidate C in FIG. 5, because Candidate C ends after DRX ON duration 510.

In another example, e.g., at 1208, the UE may decode the first bundled M-PDCCH candidate when any of the subframes of the first bundled M-PDCCH candidate are within the DRX ON duration. In this example the UE may determine to decode both Candidate A and Candidate C in FIGS. 4 and 5, because both candidates have at least one subframe that overlap DRX ON 410, 510. In FIG. 6, the UE may determine to decode Candidate A, Candidate C, and Candidate D, while refraining from decoding Candidate E.

At times, multiple candidates may partially overlap the DRX ON cycle. Thus, at 1210, the UE may determine a set of subframes carrying a second bundled M-PDCCH candidate, wherein the subframes of the first bundled M-PDCCH candidate are partially outside of the DRX ON duration and the subframes of the second bundled M-PDCCH candidate are partially outside of the DRX ON duration. The UE may then determine at 1212 which bundled M-PDCCH candidate to monitor based on an overlap between the DRX ON duration and the subframes of the first bundled M-PDCCH candidate and the second bundled M-PDCCH candidate. At 1214, the UE may decode one of the first bundled M-PDCCH candidate and the second bundled M-PDCCH candidate based on the determination. For example, the UE may select between decoding Candidate A and Candidate C in FIGS. 4 and 5. The UE may select between decoding Candidate A, Candidate C, and Candidate D in FIG. 6. The determination may be based on an amount of overlap between the DRX ON duration and the subframes of each of the candidates.

Figure 13:
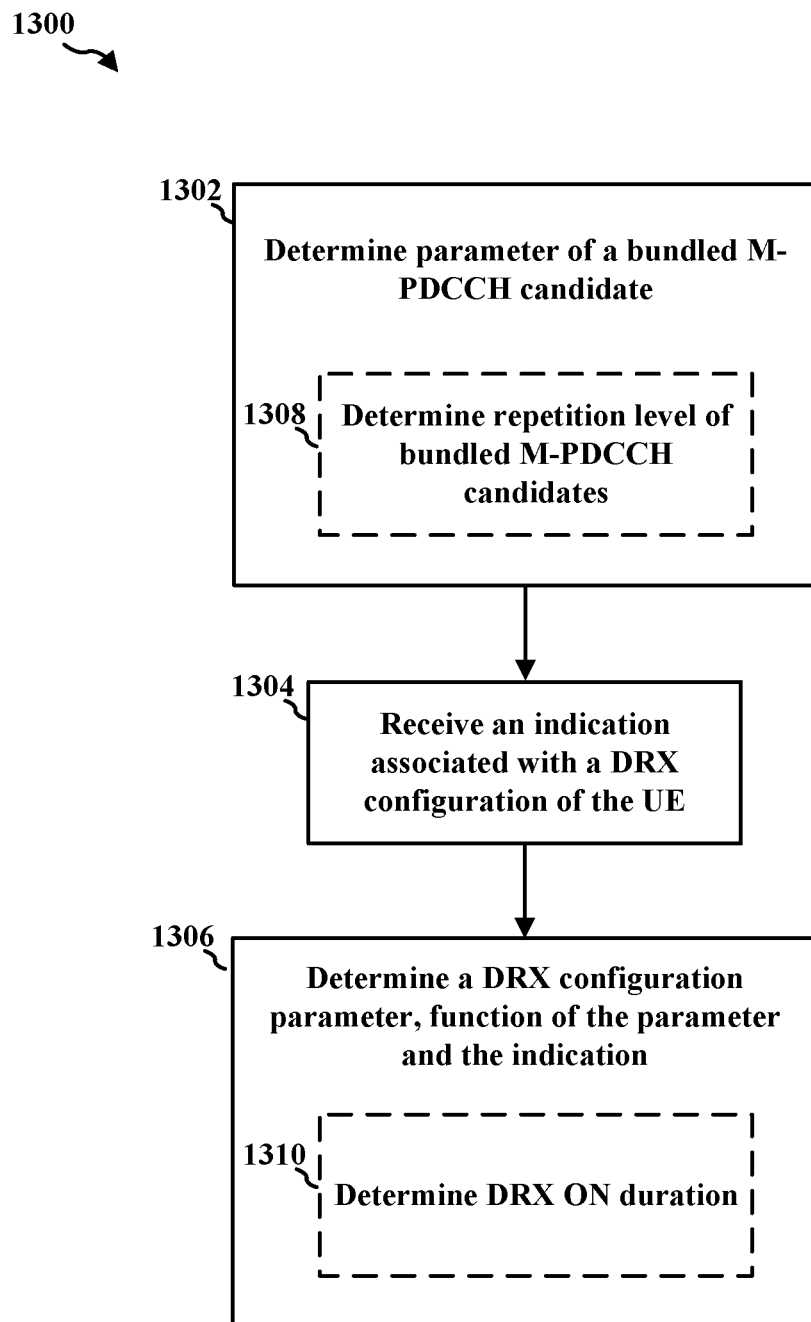
FIG. 13 is a flowchart of a method of wireless communication.

FIG. 13 is a flowchart 1300 of a method of wireless communication. The method may be performed by a UE (e.g., the UE 104, the apparatus 1702/1702'). At 1302, the UE determines a parameter of a bundled M-PDCCH candidate monitored by the UE. As illustrated at 1308, as a part of the determination of the DRX configuration parameter, the UE may determine a repetition level for each of a plurality of bundled M-PDCCH candidates monitored by the UE. This information may be received, e.g., from an eNB.

At 1304, the UE receives an indication associated with a DRX configuration of the UE. The indication may comprise a number of subframes for which the UE should monitor PDCCH. This indicate may be received from an eNB that will transmit the PDCCH.

At 1306, the UE determines a DRX configuration parameter, the DRX configuration parameter being a function of the parameter of the M-PDCCH candidate and the indication. The UE may determine a DRX ON duration at 1310 as a function of the indication and a maximum repetition level for the plurality of bundled M-PDCCH candidates. For example, if the UE receives a bundled M-PDCCH parameter that the repetition levels are R={2, 4, 8}, and if the number of subframes for which the UE should monitor PDCCH is indicated as being psf3, e.g., 3 subframes, the UE determine the DRX ON duration as a function of the maximum repetition level, i.e., 8, and the indicated number of subframes to be monitored, e.g., 3. The function may be, e.g., DRX duration=maximum number of
repetitions*PSF=24 subframes In this example the DRX duration may be determined to be 24 subframes, and may provide enough reception time to decode 3 candidates of the largest repetition level.

Figure 14:
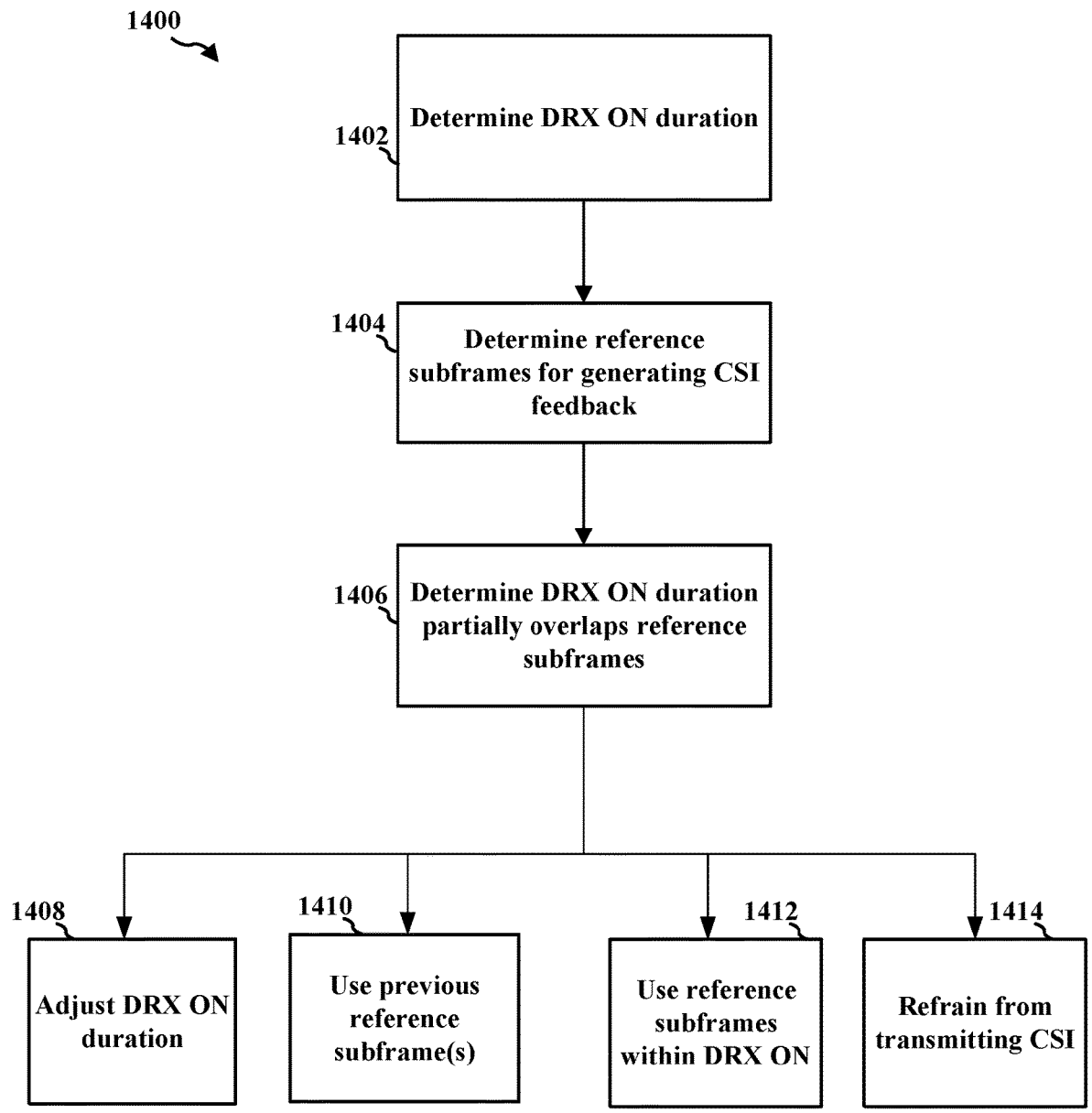
FIG. 14 is a flowchart of a method of wireless communication.

FIG. 14 is a flow chart 1400 of a method of wireless communication illustrating configurations of a DRX cycle and CSI reference subframes for a MTC UE. The method may be performed by a UE (e.g., the UE 104, the apparatus 1702/1702'). At times, the UE may need to provide CSI feedback at a particular subframe, but the reference subframe may be located outside of a DRX ON duration.

At 1402, the UE determines a DRX ON duration. This determination may be based on communication with an eNB regarding a window for the UE to turn on its receiver to receive communication from the eNB. At 1404, the UE determines a group of reference subframes for generating CSI feedback, the group of reference subframes including two or more subframes. This determination may be based on information received from the eNB regarding the subframes for CSI feedback.

At 1406, the UE determines that the DRX ON duration partially overlaps with the group of reference subframes. FIG. 9 illustrates examples of corresponding references subframes that partially overlap DRX ON 914 and that also partially overlap DRX OFF 912. The UE may perform any of a number of actions to address the partial overlap of the reference subframes.

At 1408, the UE may determine to adjust the DRX ON duration, extending it to include any reference subframes that fall outside the DRX ON duration. Thus, the UE may wake up outside of the DRX ON duration in order to receive reference subframes outside of DRX On. In FIG. 9, the UE might wake up early during DRX OFF 912 in order to receive subframes 942, 944 of the corresponding reference subframes. Although this example illustrates subframes that start before DRX ON, the UE may likewise maintain its receiver on at the end of a DRX ON period when the reference subframes instead continue after DRX ON has ended.

If the DRX cycle is short enough, the UE may instead use previous reference subframes, e.g., at 1410. For example, in the second example in FIG. 9, the UE may use subframes 936, 938 from the previous DRX ON duration 910 in combination with 946, 948 in DRX ON 914 in order to make the CSI measurements.

At 1412, the UE may instead use only the part of the reference subframes that are within the DRX ON cycle in order to make the CSI measurements. FIG. 9 illustrates this as the third example, where the UE may use only subframes 946 and 948 to make CSI measurements during DRX ON 914.

At 1414, the UE may refrain from transmitting CSI. For example, when there is no overlap or only a partial overlap, the UE may refrain from transmitting CSI measurements. Therefore, the UE might refrain from transmitting CSI measurements because reference subframes 942 and 944 are during DRX OFF 912. The UE may refrain from sending CSI when a percentage of the CSI reference subframes that are outside the DRX ON duration is beyond a threshold. If the percentage of reference subframes within the DRX duration is within the threshold, the UE may determine to transmit CSI using the overlapping reference subframes, e.g., as in 1412.

Once the UE performs one of 1408, 1410, 1412, and 1414, the UE may perform the CSI measurements using the reference subframes determined at 1408, 1410, 1412, or 1414 and may transmit information regarding the CSI measurements to the eNB.

Figure 15:
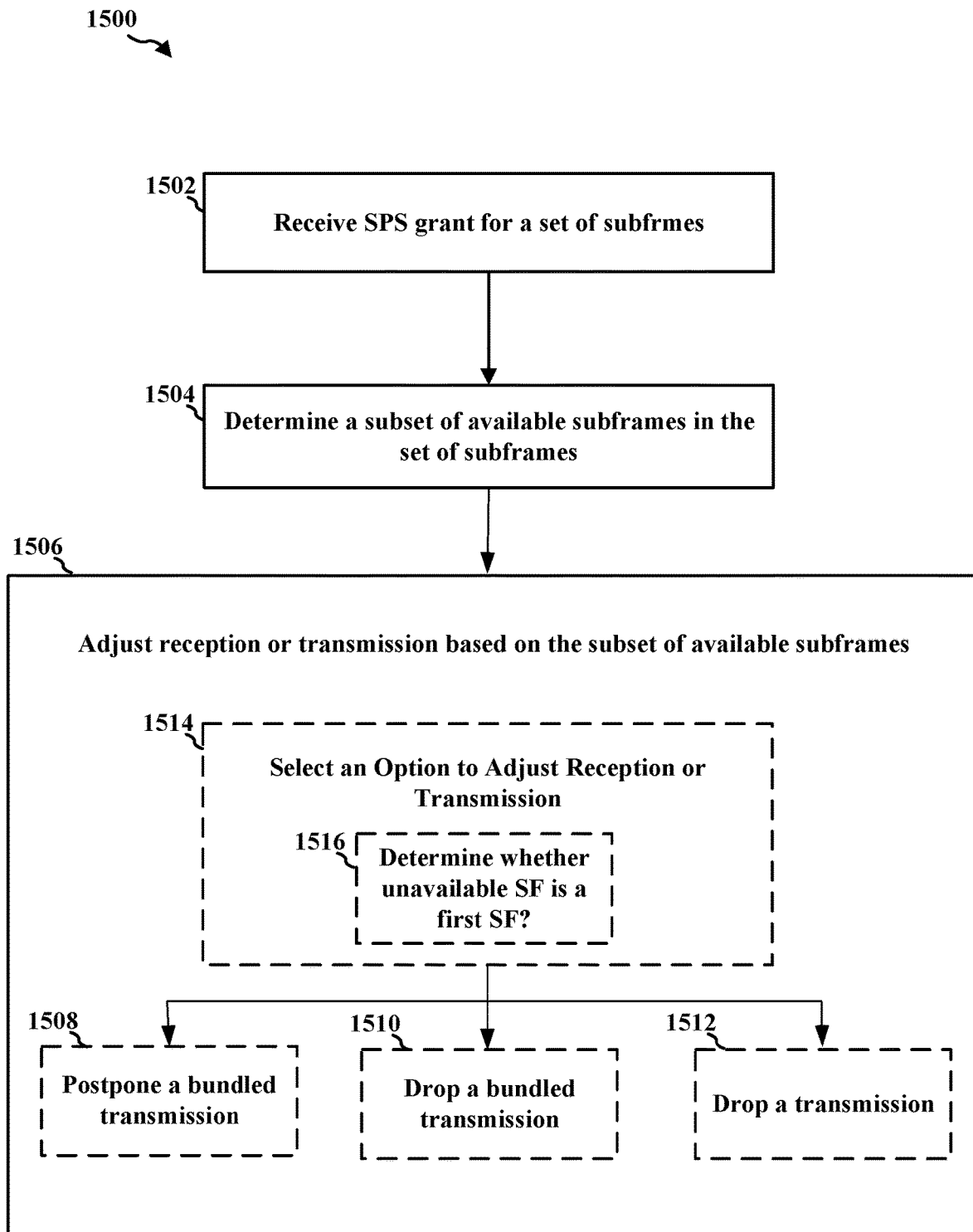
FIG. 15 is a flowchart of a method of wireless communication.

FIG. 15 is a flowchart 1500 of a method of wireless communication. The method may be performed by a UE (e.g., the UE 104, the apparatus 1702/1702'). At 1502, the UE receives an SPS grant for a set of subframes, the set of subframes including an unavailable subframe. The UE may receive an SPS activation grant from an eNB. Certain subframes may be invalid subframes that are not available for the UE to use for transmission and/or reception.

At 1504, the UE may determine a subset of available subframes in the set of subframes for which it received the SPS grant. For example, after receiving the SPS grant, the UE may consider which subframes within the SPS grant are invalid or unavailable.

At 1506, the UE may adjust reception or transmission during the set of subframes based on the subset of available subframes. The UE may perform any of a number of actions to address invalid subframes within an SPS grant, e.g., any of 1508, 1510, or 1512. In one example, as part of adjusting the reception or transmission at 1508, the UE may postpone a bundled transmission scheduled for the unavailable subframe and for any subframe of the set of subframes that is subsequent to the unavailable subframe at 1508.

In another example, as part of adjusting the reception or transmission at 1506, the UE may drop a bundled transmission scheduled for the unavailable subframe at 1510.

In another example, as part of adjusting the reception or transmission at 1506, the UE may drop a transmission scheduled that includes transmitting during the unavailable subframe at 1512.

At 1514 the UE may select an option to adjust the reception or transmission during the set of subframes based on an amount of bundling employed, the option comprising at least one of 1508, 1510, or 1512. Thus, the UE may select between performing 1508, 1510, and 1512 based on an amount of bundling employed.

For example, the UE may drop a scheduled transmission that includes transmitting during the unavailable subframe at 1510, when the subframe is a first subframe and may postpone a bundled transmission scheduled for the unavailable subframe at 1508 and for any subframe of the set of subframes that is subsequent to the unavailable subframe when the unavailable subframe is after the first subframe. Thus, the UE may determine at 1516 whether the unavailable SF is a first subframe as part of selecting the option at 1514.

Figure 16:
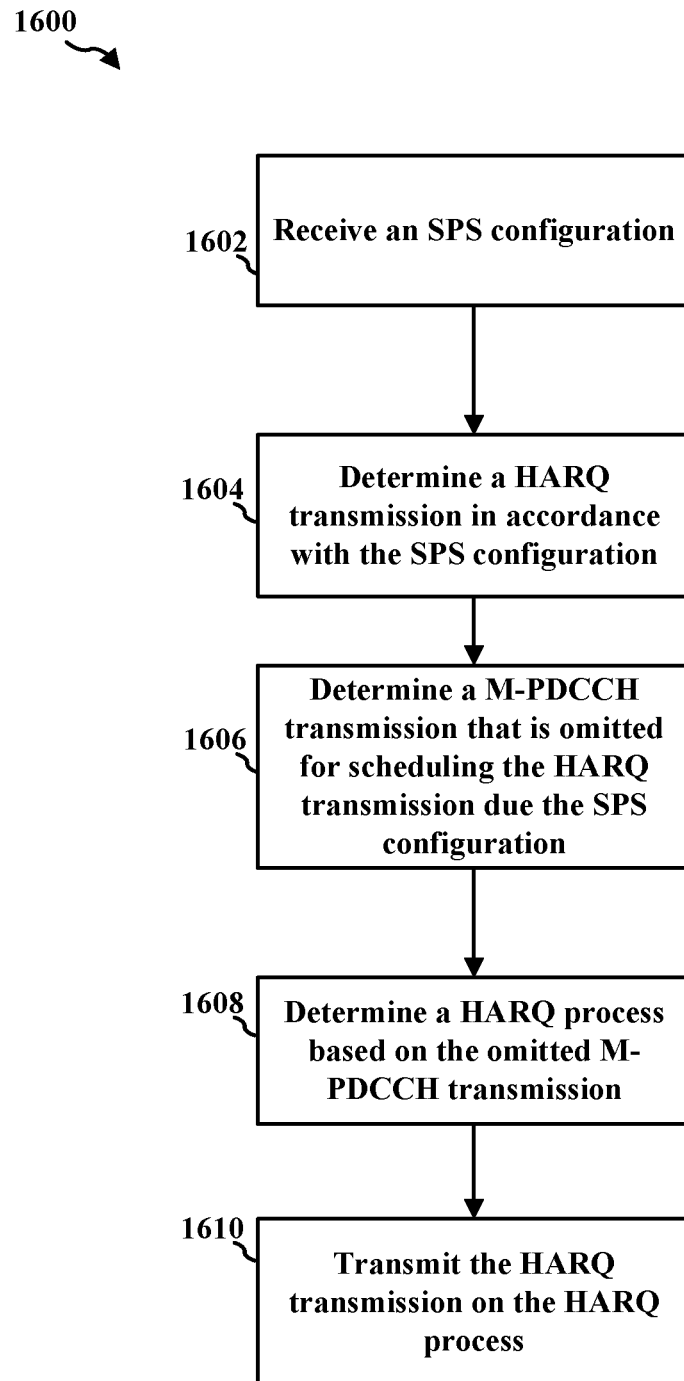
FIG. 16 is a flowchart of a method of wireless communication.

FIG. 16 is a flowchart 1600 of a method of wireless communication. The method may be performed by a UE (e.g., the UE 104, the apparatus 1702/1702'). The UE may be an MTC UE. At 1602, the UE receives an SPS configuration, e.g., from an eNB. The SPS configuration indicates when the UE should transmit or receive communication with the eNB. When an MTC UE has been configured with M-PUSCH SPS, the MTC UE does not receive M-PDCCH during the configured SPS period.

At 1604, the UE may determine a HARQ transmission in accordance with the SPS configuration. At 1606, the UE determines an M-PDCCH transmission that is omitted for scheduling the HARQ transmission due the SPS configuration. This may be considered a virtual M-PDCCH transmission that could have scheduled an M-PUSCH. For example, for an M-PUSCH starting at subframe N, the UE may determine the omitted M-PDCCH occasion to start at subframe N+k, k being the scheduling timing. At 1608, the UE determines a HARQ process based on the omitted M-PDCCH transmission. For example, the UE may determine a HARQ process ID assigned to a particular M-PUSCH based on the omitted M-PDCCH occasion. As an example, an MTC UE having 2 HARQ processes would have every other M-PDCCH occasion associated with one of the 2 HARQ processes.

At 1610, the UE transmits the HARQ transmission based on the determined HARQ process.

Figure 17:
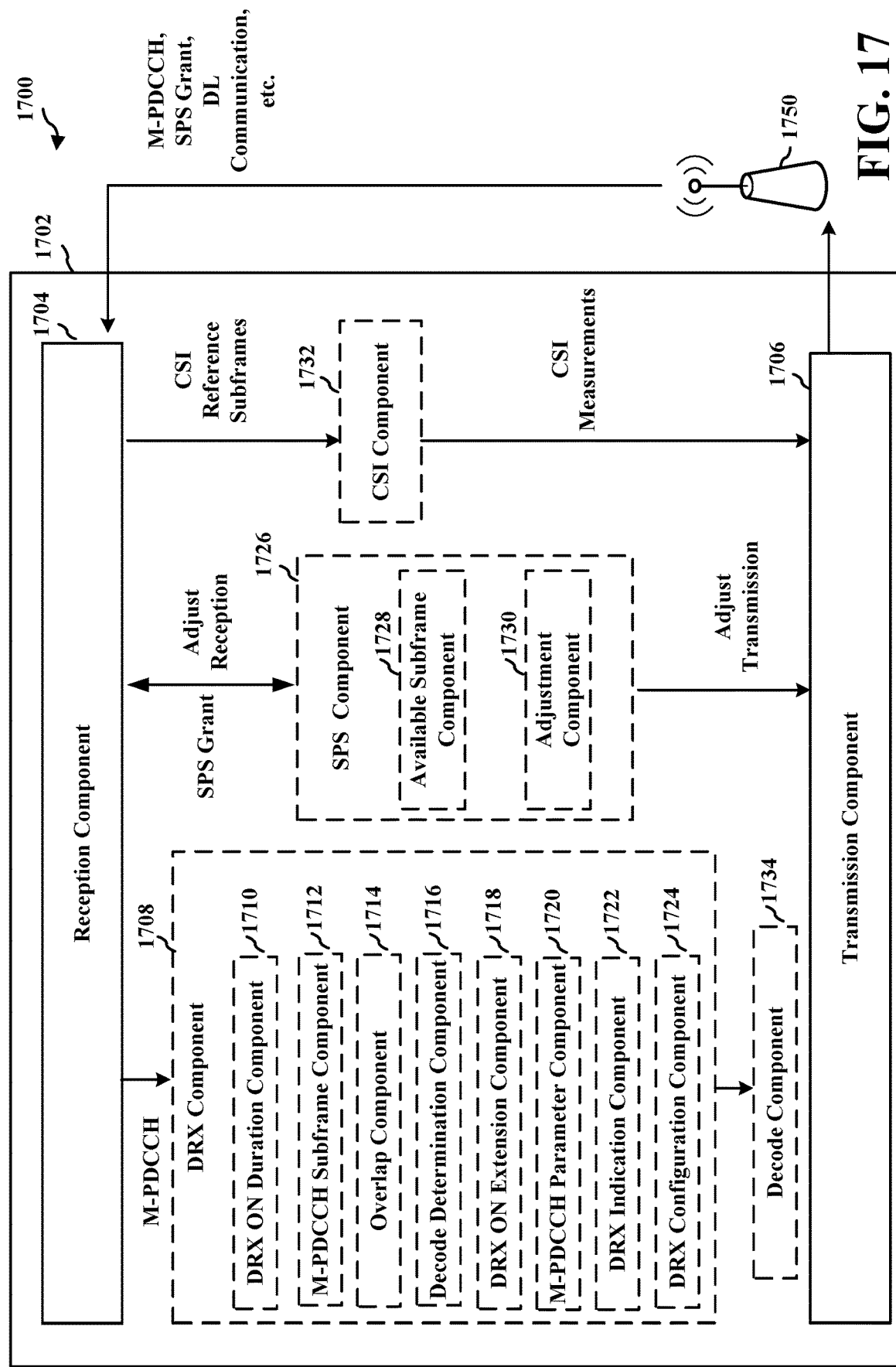
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a UE. The apparatus includes a reception component 1704 that receives DL communication, including, e.g., bundled M-PDCCH candidates, DRX configuration parameters, CSI reference signals, etc., from an eNB 1750. The apparatus comprises a transmission component 1706 that transmits UL communication to eNB 1750, including CSI measurements, etc. The apparatus may include a DRX component 1708 that determines DRX parameters and handles partially overlapping M-PDCCH subframes. The DRX Component 1708 may include a DRX ON duration component 1710 that determines a DRX ON duration, an M-PDCCH subframe component 1712 that determines a set of subframes carrying bundled M-PDCCH candidates, and an overlap component 1714 that determines an overlap between subframes of a DRX ON duration and subframes of bundled M-PDCCH candidates. The DRX Component 1708 may further include a decode determination component 1716 that determines whether to decode a bundled M-PDCCH candidate or whether to refrain from decoding the bundled M-PDCCH candidate. The DRX component may include a DRX ON extension component 1718 that extends the DRX ON duration to include the set of subframes entirely. The apparatus 1702 may include a decode component 1734 configured to decode the bundled M-PDCCH candidate, e.g., based on the determination by the decode determination component 1716 or based on an extension of the DRX ON duration by the DRX ON extension component 1718.

The DRX ON component 1708 may further include an M-PDCCH parameter component 1720 that determines a parameter of a bundled M-PDCCH candidate monitored by the UE, a DRX indication component 1722 that receives an indication associated with a DRX configuration of the apparatus, and a DRX configuration component 1724 that determines a DRX configuration parameter, the DRX configuration parameter being a function of the parameter of the M-PDCCH candidate and the indication.

The apparatus may include an SPS component 1726 that handles unavailable subframes within SPS grants. The SPS component 1726 may receive an SPS grant for a set of subframes The SPS component 1726 may include an available subframe component 1728 that determines a subset of available subframes in the set of subframes, as some of the subframes of the SPS grant may be unavailable. The SPS component 1726 may also include an adjustment component 1730 that adjusts reception or transmission during the set of subframes based on the subset of available subframes determined by the available subframe component 1728.

The apparatus may also include a CSI component 1732 that is configured to perform the algorithm described in connection with FIG. 14.

The apparatus may include additional components that perform each of the blocks of the algorithm in the aforementioned flowcharts of FIGS. 10-16. As such, each block in the aforementioned flowcharts of FIGS. 10-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
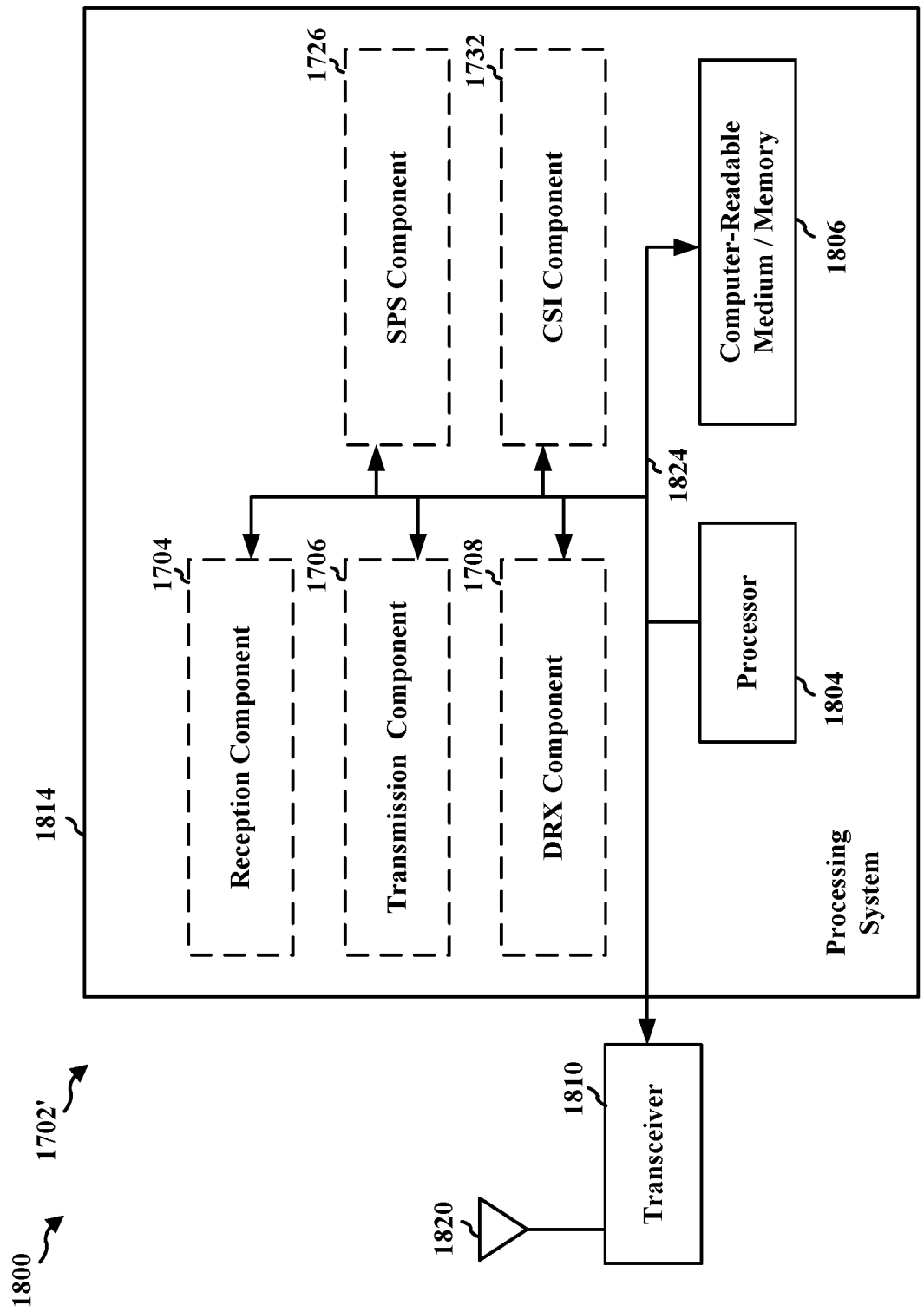
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704-1734, and the computer-readable medium/memory 1806. Although only components 1704, 1706, 1708, 1726 and 1732 are illustrated in FIG. 18, any of components 1704-1734 may be included in apparatus 1702'. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704-1734. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359.

In one configuration, the apparatus 1702/1702' for wireless communication includes any of means for determining a DRX ON duration, means for determining a set of subframes carrying bundled M-PDCCH candidates, means for determining an overlap between a DRX ON duration and subframes of the M-PDCCH candidates, means for refraining from decoding, means for decoding, means for extending the DRX ON duration, means for determining which bundled M-PDCCH candidate to monitor, means for determining a parameter of a bundled M-PDCCH candidate, means for receiving an indication associated with a DRX configuration of a UE, means for determining a DRX configuration parameter, means for receiving an SPS grant, means for determining a subset of available subframes, and means for adjusting reception or transmission. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   determining a discontinuous reception (DRX) ON duration;
   determining a set of subframes carrying a plurality of narrowband physical downlink control channel (PDCCH) candidates, the set of subframes including a plurality of subframes;
   determining that the DRX ON duration at least partially overlaps with the set of subframes, wherein the subframes of the plurality of narrowband PDCCH candidates partially fall outside of the DRX ON duration; and
   decoding a first narrowband PDCCH candidate in the plurality of narrowband PDCCH candidates when the first narrowband PDCCH candidate is within the DRX ON duration.

2. The method of claim 1, further comprising:
   determining whether a plurality of subframes of the first narrowband PDCCH candidate are within the DRX ON duration.

3. The method of claim 2, wherein the UE decodes the first narrowband PDCCH candidate, if all of the plurality of subframes of the first narrowband PDCCH candidate are within the DRX ON duration and refrains from decoding the first narrowband PDCCH candidate if at least one subframe of the plurality of subframes of the first narrowband PDCCH candidate is outside of the DRX ON duration.

4. The method of claim 2, wherein the determination of whether the plurality of subframes of the first narrowband PDCCH candidate are within the DRX ON duration is made without extending the DRX ON duration.

5. The method of claim 1, wherein the plurality of narrowband PDCCH candidates include the first narrowband PDCCH candidate and a second narrowband PDCCH, the method further comprising:
   determining to monitor the first narrowband PDCCH candidate based at least on an overlap between the DRX ON duration and the subframes of the first narrowband PDCCH candidate.

6. The method of claim 1, further comprising:
   determining to monitor one of the plurality of narrowband PDCCH candidates, the one narrowband PDCCH candidate having each subframe within the DRX ON duration.

7. The method of claim 1, wherein if the subframes of the first narrowband PDCCH candidate partially fall outside of the DRX ON duration, the UE decodes the first narrowband PDCCH candidate when the subframes of the first narrowband PDCCH candidate start within the DRX ON duration.

8. The method of claim 1, wherein if the subframes of the first narrowband PDCCH candidate partially fall outside of the DRX ON duration, the UE decodes the first narrowband PDCCH candidate when the subframes of the first narrowband PDCCH candidate end within the DRX ON duration.

9. The method of claim 1, determining a set of subframes carrying a second narrowband PDCCH candidate, wherein the subframes of the first narrowband PDCCH candidate are partially outside of the DRX ON duration and the subframes of the second narrowband PDCCH candidate are partially outside of the DRX ON duration; and
determining which narrowband PDCCH candidate to monitor based on an overlap between the DRX ON duration and the subframes of the first narrowband PDCCH candidate and the second narrowband PDCCH candidate, wherein the UE decodes the first narrowband PDCCH candidate based on the determination.

10. The method of claim 1, further comprising:
extending the DRX ON duration to include the set of subframes entirely, wherein the UE decodes the first narrowband PDCCH candidate carried in the set of subframes in the extended DRX ON duration.

11. An apparatus for wireless communication at a user equipment (UE), comprising:
means for determining a discontinuous reception (DRX) ON duration;
means for determining a set of subframes carrying a plurality of narrowband physical downlink control channel (PDCCH) candidates, the set of subframes including a plurality of subframes;
means for determining that the DRX ON duration at least partially overlaps with the set of subframes, wherein the subframes of the plurality of narrowband PDCCH candidates partially fall outside of the DRX ON duration; and
means for decoding a first narrowband PDCCH candidate in the plurality of narrowband PDCCH candidates when the first narrowband PDCCH candidate is within the DRX ON duration.

12. The apparatus of claim 11, wherein the means for determining that the DRX ON duration at least partially overlaps with the set of subframes determines whether a plurality of subframes of the first narrowband PDCCH candidate are within the DRX ON duration.

13. The apparatus of claim 12, wherein the means for decoding decode the first narrowband PDCCH candidate, if all of the plurality of subframes of the first narrowband PDCCH candidate are within the DRX ON duration and refrains from decoding the first narrowband PDCCH candidate if at least one subframe of the plurality of subframes of the first narrowband PDCCH candidate is outside of the DRX ON duration.

14. The apparatus of claim 12, wherein the determination of whether the plurality of subframes of the first narrowband PDCCH candidate are within the DRX ON duration is made without extending the DRX ON duration.

15. The apparatus of claim 11, wherein the plurality of narrowband PDCCH candidates includes the first narrowband PDCCH candidate and a second narrowband PDCCH, the apparatus further comprising:
means for determining to monitor the first narrowband PDCCH candidate based at least on an overlap between the DRX ON duration and the subframes of the first narrowband PDCCH candidate.

16. The apparatus of claim 11, further comprising:
means for determining to monitor one of the plurality of narrowband PDCCH candidates, the one narrowband PDCCH candidate having each subframe within the DRX ON duration.

17. An apparatus for wireless communication at a user equipment (UE), comprising:
a memory; and
at least one processor coupled to the memory and configured to:
determine a discontinuous reception (DRX) ON duration;
determine a set of subframes carrying a plurality of narrowband physical downlink control channel (PDCCH) candidates, the set of subframes including a plurality of subframes;
determine that the DRX ON duration at least partially overlaps with the set of subframes, wherein the subframes of the plurality of narrowband PDCCH candidates partially fall outside of the DRX ON duration; and
decode a first narrowband PDCCH candidate in the plurality of narrowband PDCCH candidates when the first narrowband PDCCH candidate is within the DRX ON duration.

18. The apparatus of claim 17, wherein the at least one processor is further configured to:
determine whether a plurality of subframes of the first narrowband PDCCH candidate are within the DRX ON duration.

19. The apparatus of claim 18, wherein the at least one processor is configured to decode the first narrowband PDCCH candidate, if all of the plurality of subframes of the first narrowband PDCCH candidate are within the DRX ON duration and to refrain from decoding the first narrowband PDCCH candidate if at least one subframe of the plurality of subframes of the first narrowband PDCCH candidate is outside of the DRX ON duration.

20. The apparatus of claim 18, wherein the determination of whether the plurality of subframes of the first narrowband PDCCH candidate are within the DRX ON duration is made without extending the DRX ON duration.

21. The apparatus of claim 17, wherein the plurality of narrowband PDCCH candidates includes the first narrowband PDCCH candidate and a second narrowband PDCCH, and wherein the at least one processor is further configured to:
determine to monitor the first narrowband PDCCH candidate based at least on an overlap between the DRX ON duration and the subframes of the first narrowband PDCCH candidate.

22. The apparatus of claim 17, wherein the at least one processor is further configured to:
determine to monitor one of the plurality of narrowband PDCCH candidates, the one narrowband PDCCH candidate having each subframe within the DRX ON duration.

23. A non-transitory computer-readable medium storing computer executable code for wireless communication at a user equipment (UE), the code when executed by a processor causes the processor to:
determine a discontinuous reception (DRX) ON duration;
determine a set of subframes carrying a plurality of narrowband physical downlink control channel (PDCCH) candidates, the set of subframes including a plurality of subframes;
determine that the DRX ON duration at least partially overlaps with the set of subframes, wherein the subframes of the plurality of narrowband PDCCH candidates partially fall outside of the DRX ON duration; and decoding a first narrowband PDCCH candidate in the plurality of narrowband PDCCH candidates when the first narrowband PDCCH candidate is within the DRX ON duration.

24. The non-transitory computer-readable medium of claim 23, further comprising code to:
   determine whether a plurality of subframes of the first narrowband PDCCH candidate are within the DRX ON duration.

25. The non-transitory computer-readable medium of claim 24, further comprising code to:
   decode the first narrowband PDCCH candidate, if all of the plurality of subframes of the first narrowband PDCCH candidate are within the DRX ON duration; and
   refrain from decoding the first narrowband PDCCH candidate if at least one subframe of the plurality of subframes of the first narrowband PDCCH candidate is outside of the DRX ON duration.

26. The non-transitory computer-readable medium of claim 24, wherein the determination of whether the plurality of subframes of the first narrowband PDCCH candidate are within the DRX ON duration is made without extending the DRX ON duration.

27. The non-transitory computer-readable medium of claim 23, wherein the plurality of narrowband PDCCH candidates includes the first narrowband PDCCH candidate and a second narrowband PDCCH, further comprising code to:
   determine to monitor the first narrowband PDCCH candidate based at least on an overlap between the DRX ON duration and the subframes of the first narrowband PDCCH candidate.

28. The non-transitory computer-readable medium of claim 23, further comprising code to:
   determine to monitor one of the plurality of narrowband PDCCH candidates, the one narrowband PDCCH candidate having each subframe within the DRX ON duration.

* * * * *